US011557582B2

(12) United States Patent
Kim et al.

(10) Patent No.: US 11,557,582 B2
(45) Date of Patent: Jan. 17, 2023

(54) SEMICONDUCTOR DEVICE HAVING IMPROVED MARGINS

(71) Applicant: Samsung Electronics Co., Ltd., Suwon-si (KR)

(72) Inventors: Jeong-Lim Kim, Seoul (KR); Myung Soo Noh, Suwon-si (KR); No Young Chung, Hwaseong-si (KR); Seok Yun Jeong, Osan-si (KR); Young Han Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 16/837,101

(22) Filed: Apr. 1, 2020

(65) Prior Publication Data

US 2021/0066283 A1 Mar. 4, 2021

(30) Foreign Application Priority Data

Sep. 3, 2019 (KR) .......................... 10-2019-0108535

(51) Int. Cl.
*H01L 27/02* (2006.01)
*H01L 27/092* (2006.01)
*G06F 30/392* (2020.01)
*H01L 27/11* (2006.01)
*G06F 117/12* (2020.01)

(52) U.S. Cl.
CPC ........ *H01L 27/0207* (2013.01); *G06F 30/392* (2020.01); *H01L 27/0924* (2013.01); *H01L 27/1104* (2013.01); *G06F 2117/12* (2020.01)

(58) Field of Classification Search
CPC ............. H01L 27/0207; H01L 27/0924; H01L 27/1104; H01L 27/11; H01L 29/7855; H01L 21/768; G06F 2117/12; G06F 30/392
See application file for complete search history.

(56) References Cited

U.S. PATENT DOCUMENTS

| 5,536,955 | A | * | 7/1996 | Ali ...................... H01L 27/0207 257/369 |
| 8,819,601 | B2 | | 8/2014 | Chen et al. |
| 9,236,300 | B2 | | 1/2016 | Liaw |
| 9,672,320 | B2 | | 6/2017 | Chang et al. |
| 10,282,504 | B2 | | 5/2019 | Wu et al. |
| 2008/0250374 | A1 | | 10/2008 | Lucas et al. |

(Continued)

*Primary Examiner* — Nilufa Rahim
(74) *Attorney, Agent, or Firm* — Muir Patent Law, PLLC

(57) ABSTRACT

A semiconductor device comprising first and second unit cells, the first unit cell comprising a first fin pattern extending in a first direction, a first gate pattern extending in a second direction, and a first contact disposed on a side of the first gate pattern contacting the first fin pattern, the second unit cell comprising a second fin pattern extending in the first direction, a second gate pattern extending in the second direction, and a second contact disposed on a side of the second gate pattern contacting the second fin pattern, wherein the first and second gate patterns are spaced apart and lie on a first straight line extending in the second direction, the first and second contacts are spaced apart and lie on a second straight line extending in the second direction, and a first middle contact is disposed on and connects the first and second contacts.

19 Claims, 19 Drawing Sheets

(56) References Cited

U.S. PATENT DOCUMENTS

| | | | |
|---|---|---|---|
| 2013/0082331 A1* | 4/2013 | Fukuda | H01L 27/1116 |
| | | | 257/E21.409 |
| 2017/0062475 A1* | 3/2017 | Song | H01L 27/0207 |
| 2017/0207185 A1 | 7/2017 | Wallace et al. | |
| 2018/0294256 A1* | 10/2018 | Lee | H01L 21/823821 |
| 2019/0095552 A1 | 3/2019 | Lei et al. | |

* cited by examiner

SEMICONDUCTOR DEVICE HAVING IMPROVED MARGINS

CROSS-REFERENCE TO RELATED APPLICATION

This application claims the benefit of Korean Patent Application No. 10-2019-0108535, filed on Sep. 3, 2019, in the Korean Intellectual Property Office, the disclosure of which is incorporated herein in its entirety by reference.

BACKGROUND

1. Technical Field

The present disclosure relates to a semiconductor device and a layout design method.

2. Description of the Related Art

With the recent rapid downscaling of semiconductor elements due to the development of the electronic technology, semiconductor devices are required to be more highly integrated and consume less power. In order to meet the demand for higher integration and lower power consumption, semiconductor devices are continuously being reduced in feature size.

However, the reduced feature size causes an insufficient margin between adjacent patterns.

SUMMARY

Aspects of the present disclosure provide a semiconductor device having an improved margin between adjacent patterns.

Aspects of the present disclosure also provide a layout design method which improves a margin between adjacent patterns by performing layout correction on a region where a process defect occurs easily due to an insufficient process margin.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a semiconductor device comprising a first unit cell and a second unit cell, wherein the first unit cell comprises a first fin pattern extending lengthwise in a first direction, a first gate pattern extending lengthwise in a second direction to intersect the first fin pattern and a first contact disposed on a side of the first gate pattern to contact the first fin pattern, wherein the second unit cell comprises a second fin pattern extending lengthwise in the first direction, a second gate pattern extending lengthwise in the second direction to intersect the second fin pattern and a second contact disposed on a side of the second gate pattern to contact the second fin pattern, and wherein the first gate pattern and the second gate pattern are spaced apart from each other and lie on a first straight line extending lengthwise in the second direction, the first contact and the second contact are spaced apart from each other and lie on a second straight line extending lengthwise in the second direction, and a first middle contact is disposed on the first contact and the second contact and connects the first contact and the second contact to each other.

According to another aspect of the present disclosure, there is provided a semiconductor device comprising, a first gate pattern and a second gate pattern which lie on a first straight line extending in a first direction and extend lengthwise in the first direction, a first contact and a second contact which lie on a second straight line extending in the first direction and extend lengthwise in the first direction and a middle contact which is disposed on the first contact and the second contact and extends in the first direction to connect the first contact and the second contact to each other, wherein a first gap between the first gate pattern and the second gate pattern is smaller than a second gap between the first contact and the second contact.

According to another aspect of the present disclosure, there is provided a semiconductor device comprising, a first fin pattern, a second fin pattern, and a third fin pattern which are arranged sequentially, a first contact, a second contact, and a third contact which contact the first fin pattern, the second fin pattern, and the third fin pattern, respectively, a first middle contact which is disposed on the first contact and the second contact and directly contacts the first contact and the second contact and a second middle contact which is disposed on the third contact, is formed at the same vertical level as the first middle contact, and directly contacts the third contact, wherein the first middle contact is connected to a first voltage, and the second middle contact is connected to a second voltage higher than the first voltage.

According to another aspect of the present disclosure, there is provided a layout design method comprising, preparing an original layout, wherein the original layout comprises a first SRAM unit cell and a second SRAM unit cell, searching for an original contact pattern which directly connects a first fin pattern of the first SRAM unit cell and a second fin pattern of the second SRAM unit cell, generating a first contact pattern which directly contacts the first fin pattern and a second contact pattern which directly contacts the second fin pattern by cutting the original contact pattern, generating a first target pattern and a second target pattern by reflecting etch skew in the first contact pattern and the second contact pattern and performing optical proximity correction (OPC) on the first target pattern and the second target pattern.

DETAILED DESCRIPTION

Figure 1:
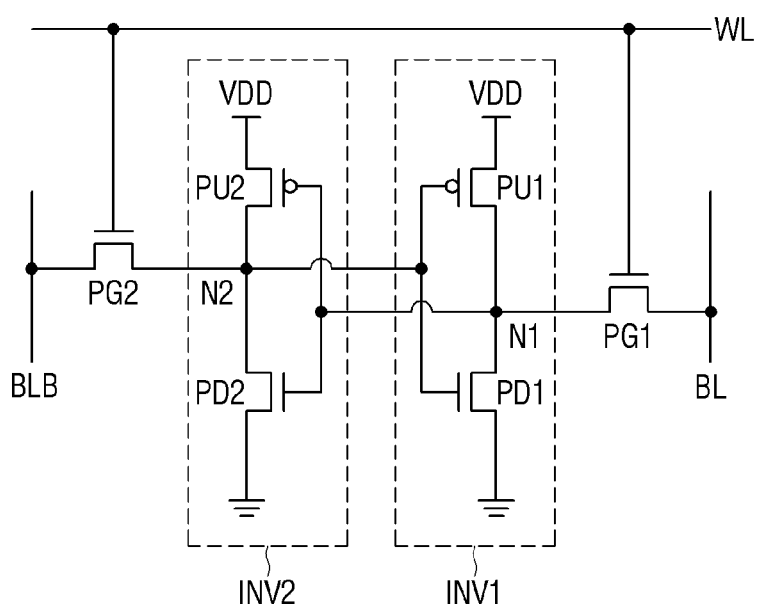
FIG. 1 is a circuit diagram of a semiconductor device according to example embodiments.

Hereinafter, various embodiments of the present disclosure will be described with reference to the attached drawings. In the drawings, the size and relative sizes of layers and regions may be exaggerated for clarity. Like numbers refer to like elements throughout. Though the different figures show variations of exemplary embodiments, these figures are not necessarily intended to be mutually exclusive from each other. Rather, as will be seen from the context of the detailed description below, certain features depicted and described in different figures can be combined with other features from other figures to result in various embodiments, when taking the figures and their description as a whole into consideration.

FIG. 1 is a circuit diagram of a semiconductor device according to example embodiments.

The semiconductor device according to the example embodiments may be, but is not limited to, a static random access memory (SRAM), a dynamic random access memory (DRAM), a mobile DRAM, a flash memory, an electrically erasable programmable read-only memory (EEPROM), a resistive random access memory (RRAM), a phase-change random access memory (PRAM), or a ferroelectric random access memory (FeRAM). For ease of description, the following description will be given based on an SRAM.

Referring to FIG. 1, an SRAM unit cell includes a first inverter INV1, a second inverter INV2, a first pass element PG1, and a second pass element PG2.

The first inverter INV1 and the second inverter INV2 output data having opposite phases. Specifically, the first inverter INV1 includes a first pull-up element PU1 and a first pull-down element PD1. The first pull-up element PU1 may be, but is not limited to, a p-channel metal oxide semiconductor (PMOS) transistor, and the first pull-down element PD1 may be, but is not limited to, an n-channel metal oxide semiconductor (NMOS) transistor.

The second inverter INV2 includes a second pull-up element PU2 and a second pull-down element PD2. The second pull-up element PU2 may be, but is not limited to, a PMOS transistor, and the second pull-down element PD2 may be, but is not limited to, an NMOS transistor.

Sources of the pull-down elements PD1 and PD2 are connected to a first voltage (e.g., a ground voltage VSS). In addition, sources of the pull-up elements PU1 and PU2 are connected to a second voltage (e.g., a power supply voltage VDD) higher than the first voltage, and drains of the pull-up elements PU1 and PU2 are connected to drains of the corresponding pull-down elements PD1 and PD2, respectively. In addition, an input terminal of the first inverter INV1 is connected to an output terminal/node N2 of the second inverter INV2, and an input terminal of the second inverter INV2 is connected to an output terminal/node N1 of the first inverter INV1.

The first pass element PG1 has a gate connected to a word line WL, a drain connected to a bit line BL, and a source connected to the output terminal/node N1 of the first inverter INV1. The second pass element PG2 also has a gate connected to the word line WL, a drain connected to a bit line bar BLB, and a source connected to the output terminal/node N2 of the second inverter INV2. Here, an inverted bit line signal is transmitted to the bit line bar BLB.

The SRAM unit cell operates as follows. When the potential of the word line WL is 1 (i.e., high), the first pass element PG1 and the second pass element PG2 are turned on to transmit signals of the bit lines BL and BLB to the first inverter INV1 and the second inverter INV2, respectively. Accordingly, a data write or read operation is performed.

Figure 2:
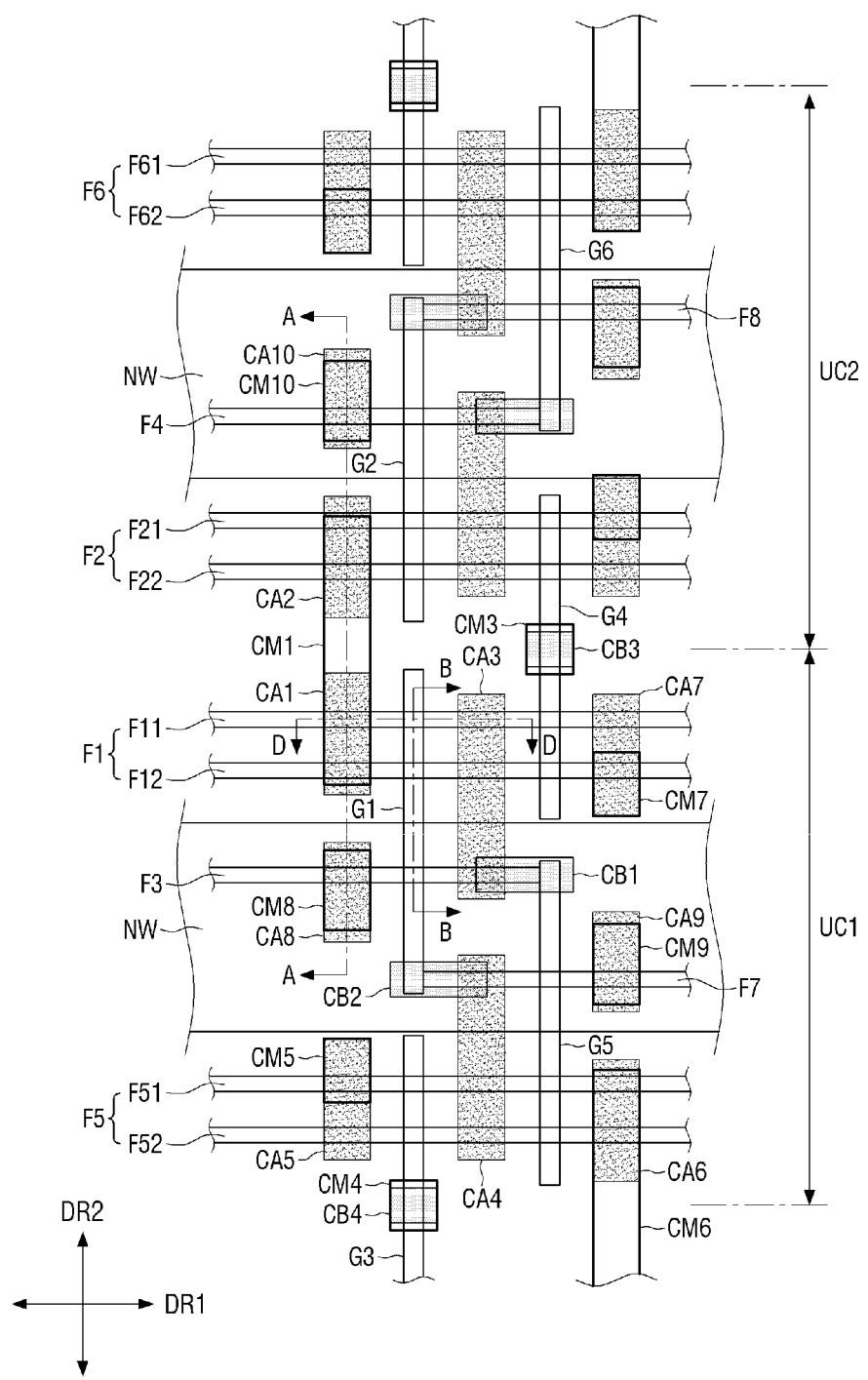
FIG. 2 is a layout view of a semiconductor device according to a first example embodiment.
Figure 3:
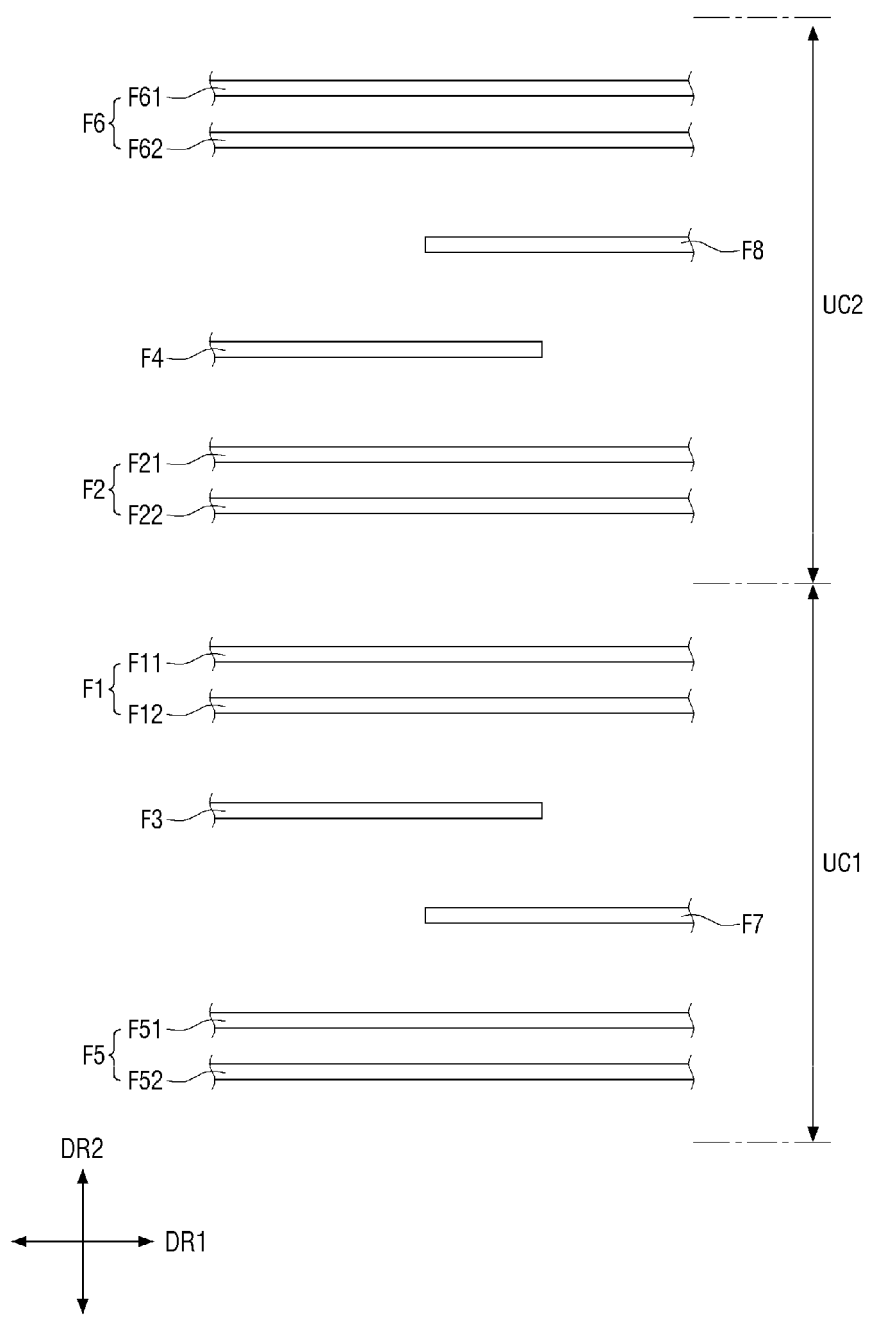
FIG. 3 is a layout view of a plurality of fin patterns of FIG. 2.
Figure 4:
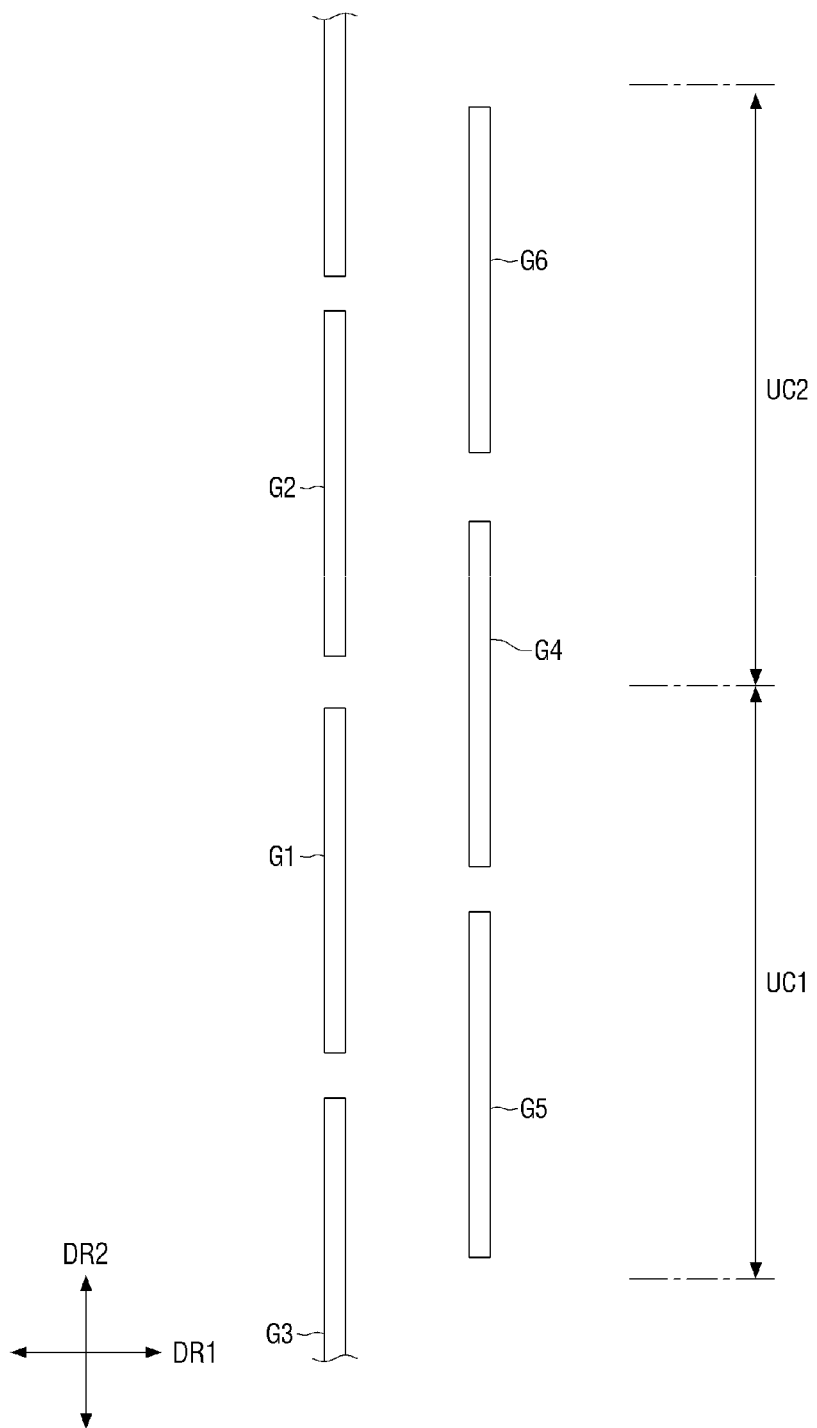
FIG. 4 is a layout view of a plurality of gate patterns of FIG. 2.
Figure 5:
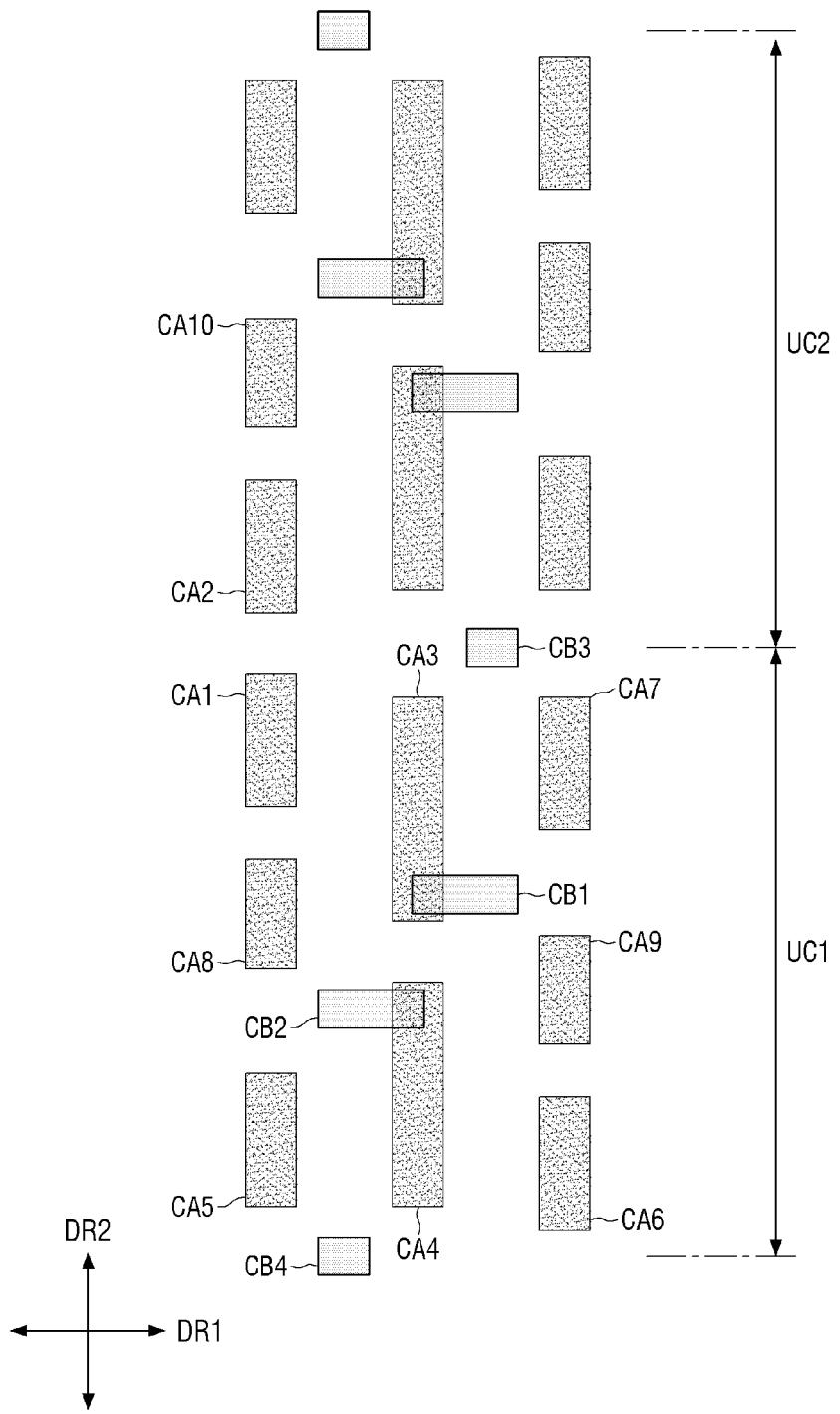
FIG. 5 is a layout view of a plurality of contacts of FIG. 2.
Figure 6:
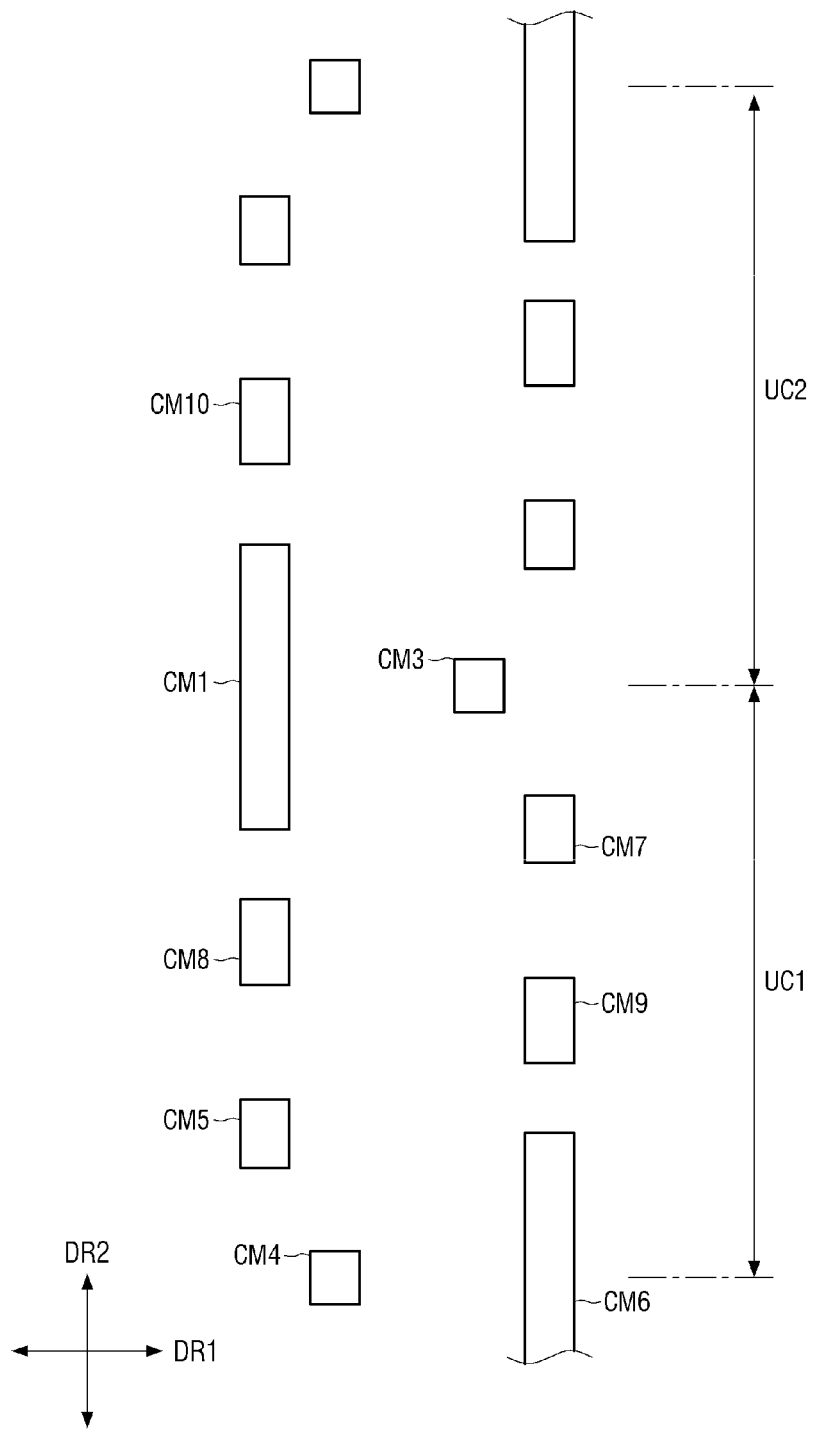
FIG. 6 is a layout view of a plurality of middle contacts of FIG. 2.
Figure 7:
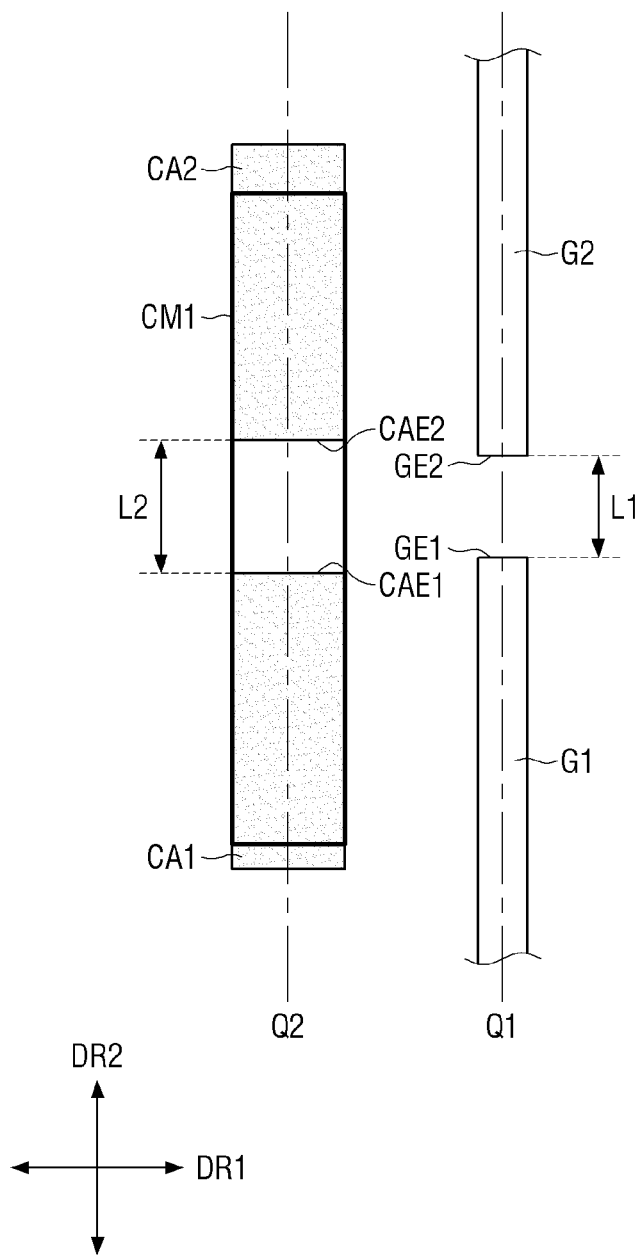
FIG. 7 is a detailed layout view of some elements (the gate patterns, the contacts, and the middle contact) of FIG. 2.

FIG. 2 is a layout view of a semiconductor device according to a first embodiment. FIG. 3 is a layout view of a plurality of fin patterns F1 through F8 of FIG. 2. FIG. 4 is a layout view of a plurality of gate patterns G1 through G6 of FIG. 2. FIG. 5 is a layout view of a plurality of contacts CA1 through CA10 and CB1 through CB4 of FIG. 2. FIG. 6 is a layout view of a plurality of middle contacts CM1 and CM3 through CM10 of FIG. 2. FIG. 7 is a detailed layout view of some elements (e.g., the gate patterns G1 and G2, the contacts CA1 and CA2, and the middle contact CM1) of FIG. 2.

The semiconductor device according to the first embodiment includes the fin patterns F1 through F8, the gate patterns G1 through G6, the contacts CA1 through CA10 and CB1 through CB4, and the middle contacts CM1 and CM3 through CM10.

First, referring to FIGS. 2 and 3, the fin patterns F1 through F8 may be formed in an active region of a substrate. Each of the fin patterns F1 through F8 may extend lengthwise along a first direction DR1. The fin patterns F1 through F8 may be spaced apart from each other and arranged along a second direction DR2. The first direction DR1 may be perpendicular to the second direction DR2.

As illustrated, some fin patterns (e.g., F1, F2, F5 and F6) may include a plurality of sub-fin patterns. For example, the first fin pattern F1 may include at least two sub-fin patterns F11 and F12, the second fin pattern F2 may include at least two sub-fin patterns F21 and F22, the fifth fin pattern F5 may include at least two sub-fin patterns F51 and F52, and the sixth fin pattern F6 may include at least two sub-fin patterns F61 and F62. The use of at least two sub-fin patterns (e.g., F11 and F12) widens a region where a current can flow between a source and a drain, thereby increasing the current driving capability of a transistor.

As illustrated, a gap between adjacent sub-fin patterns (e.g., F11 and F12) (that is, a gap between F11 and F12 in the second direction DR2) may be smaller than a gap between adjacent fin patterns (e.g., F1 and F2) (that is, a gap between F11 and F22 in the second direction DR2).

In FIG. 2, the fin patterns F1, F2, F5 and F6 having a plurality of sub-fin patterns (e.g., F11 and F12, F21 and F22, F51 and F52, and F61 and F62) may be used as source/drain regions of NMOS transistors (i.e., the pull-down elements PD1 and PD2 and the pass elements PG1 and PG2). In addition, other fin patterns F3, F4, F7 and F8 may be used as source/drain regions of PMOS transistors (i.e., the pull-up elements PU1 and PU2).

N wells NW may be formed in the substrate 100 in regions where the pull-up elements PU1 and PU2 are formed (that is, regions where the fin patterns F3, F4, F7 and F8 are formed). P wells may also be formed in the substrate 100 in regions where the pull-down elements PD1 and PD2 or the pass elements PG1 and PG2 are formed (that is, regions where the fin patterns F1, F2, F5 and F6 are formed). However, embodiments are not limited to this case.

Referring to FIGS. 2 and 4, the gate patterns G1 through G6 may extend along the second direction DR2. Specifically, some gate patterns G1, G2 and G3 may lie on a straight line extending lengthwise in the second direction DR2. Some other gate patterns G4, G5 and G6 may lie on another straight line extending lengthwise in the second direction DR2. For example, the longitudinal axes of gate patterns G1, G2, and G3 may be aligned along the same first straight line, and the longitudinal axes of gate patterns G4, G5, and G6 may be aligned along the same second straight line. The gate patterns G1, G2 and G3 are spaced apart from the gate patterns G4, G5 and G6 in the first direction DR1.

In addition, the gate patterns G1 through G6 may intersect the corresponding fin patterns F1 through F8. For example, the gate pattern G1 intersects the fin patterns F1 and F3, the gate pattern G2 intersects the fin patterns F2 and F4, the gate pattern G3 intersects the fin pattern F5, the gate pattern G4 intersects the fin patterns F1 and F2, the gate pattern G5 intersects the fin patterns F5 and F7, and the gate pattern G6 intersects the fin patterns F6 and F8.

Referring to FIGS. 2 and 5, the contacts CA1 through CA10 may be source/drain contacts. Some contacts CA1, CA2, CA5, CA8 and CA10 may lie on a straight line extending lengthwise in the second direction DR2. Some other contacts CA3 and CA4 may lie on another straight line extending lengthwise in the second direction DR2. Some other contacts CA6, CA7 and CA9 may lie on another straight line extending lengthwise in the second direction DR2. For example, the longitudinal axes of contacts CA1, CA2, CA5, CA8 and CA10 may be aligned along the same first straight line, the longitudinal axes of contacts CA3 and CA4 may be aligned along the same second straight line, and the longitudinal axes of contacts CA6, CA7 and CA9 may be aligned along the same third straight line.

The contacts CA1 and CA3 through CA9 are disposed in a first unit cell UC1, and the contacts CA2 and CA10 are disposed in a second unit cell UC2.

Specifically, in the first unit cell UC1, the contact CA1 is formed on a first side of the first gate pattern G1 to contact the first fin pattern F1.

The contact CA3 is formed on a second side of the first gate pattern G1, a first side of the fifth gate pattern G5, and a first side of the fourth gate pattern G4 (that is, between the first and fifth gate patterns G1 and G5 and between the first and fourth gate pattern G1 and G4) to contact the first fin pattern F1 and the third fin pattern F3.

The contact CA4 is formed on the second side of the first gate pattern G1, a second side of the third gate pattern G3, and the first side of the fifth gate pattern G5 (that is, between the first G1 and the fifth gate pattern G5 and between the third gate pattern G3 and the fifth gate pattern G5) to contact the fifth fin pattern F5 and the seventh fin pattern F7.

The contact CA5 is formed on a first side of the third gate pattern G3 to contact the fifth fin pattern F5. The contact CA6 is formed on a second side of the fifth gate pattern G5 to contact the fifth fin pattern F5. The contact CA7 is formed on a second side of the fourth gate pattern G4 to contact the first fin pattern F1. The contact CA8 is formed on the first side of the first gate pattern G1 to contact the third fin pattern F3. The contact CA9 is formed on the second side of the fifth gate pattern G5 to contact the seventh fin pattern F7.

In addition, in the second unit cell UC2, the contact CA2 is formed on a first side of the second gate pattern G2 to contact the second fin pattern F2. The contact CA10 is formed on the first side of the second gate pattern G2 to contact the fourth fin pattern F4.

Referring to FIGS. 2 and 5, the contacts CB1 through CB4 may be gate contacts.

The contact CB1 is disposed on the fifth gate pattern G5. In particular, the contact CB1 is also disposed on the third fin pattern F3 and contacts the contact CA3. For example, the fifth gate pattern G5 is electrically connected to a part of the first fin pattern F1 and a part of the third fin pattern F3 located on the second side of the first gate pattern G1 through the contacts CB1 and CA3. The contacts CB1 and CA3 correspond to the node N2 of FIG. 1. As described above, referring to FIG. 1, a gate of the first pull-up element PU1, a gate of the first pull-down element PD1, the source of the second pull-up element PU2, and the drain of the second pull-down element PD2 are connected at the node N2.

The contact CB2 is disposed on the first gate pattern G1. In particular, the contact CB2 is also disposed on the seventh fin pattern F7 and contacts the contact CA4. For example, the first gate pattern G1 is electrically connected to a part of the seventh fin pattern F7 and a part of the fifth fin pattern F5 located on the first side of the fifth gate pattern G5 through the contacts CB2 and CA4. The contacts CB2 and CA4 correspond to the node N1 of FIG. 1. As described above, referring to FIG. 1, a gate of the second pull-up element PU2, a gate of the second pull-down element PD2, the source of the first pull-up element PU1, and the drain of the first pull-down element PD1 are connected at the node N1.

The contact CB3 is disposed on the fourth gate pattern G4 and electrically connected to a word line WL. The contact CB4 is disposed on the third gate pattern G3 and electrically connected to a word line WL.

Referring to FIGS. 2 and 6, the middle contacts CM1 and CM3 through CM10 are disposed on the contacts CA1 through CA10 and CB1 through CB4. In addition, some middle contacts (e.g., CM1) may directly contact corresponding contacts (e.g., CA1 and CA2) and electrically connect the corresponding contacts CA1 and CA2. For example, the middle contacts CM1 and CM3 through CM10 are used to route electrical signals of adjacent gate contacts and/or source/drain contacts to each other.

The middle contacts CM1 and CM3 through CM10 are different from a wiring structure (i.e., a wiring structure including a via and/or general wiring). Each of the middle contacts CM1 and CM3 through CM10 may be shaped like a wiring not including a via and extending lengthwise in one direction. The middle contacts CM1 and CM3 through CM10 may be relatively shorter in length than the general wiring.

When seen in cross section, the middle contacts CM1 and CM3 through CM10 may be formed at the same vertical level.

Some middle contacts CM1, CM5, CM8, and CM10 may lie on a straight line extending lengthwise in the second direction DR2. Some other middle contacts CM6, CM7, and CM9 may lie on another straight line extending lengthwise in the second direction DR2. For example, the longitudinal axes of middle contacts CM1, CM5, CM8, and CM10 may be aligned along the same first straight line, and the longitudinal axes of middle contacts CM6, CM7, and CM9 may be aligned along the same second straight line.

The middle contact CM1 is disposed on the adjacent contacts CA1 and CA2 and connects the adjacent contacts CA1 and CA2 to each other. The middle contact CM1 is electrically connected to a first voltage (e.g., a ground voltage VSS).

The middle contact CM3 may be disposed on the contact CB3 and may be electrically connected to the word line WL. The middle contact CM4 may be disposed on the contact CB4 and may be electrically connected to the word line WL. The middle contact CM5 may be disposed on the contact CA5 and may be electrically connected to a bit line BL. The middle contact CM6 may be disposed on the contact CA6 and may be electrically connected to the first voltage (e.g., the ground voltage VSS). The middle contact CM7 may be disposed on the contact CA7 and may be electrically connected to a bit line BLB. The middle contact CM8 may be disposed on the contact CA8 and may be electrically connected to a second voltage (e.g., a power supply voltage VDD). The middle contact CM9 may be disposed on the contact CA9 and may be electrically connected to the second voltage (e.g., the power supply voltage VDD). The middle contact CM10 may be disposed on the contact CA10 and may be electrically connected to the second voltage (e.g., the power supply voltage VDD).

In addition, no middle contact is disposed on the contacts CA3 and CB1, and no middle contact is disposed on the contacts CA4 and CB2.

Here, referring to FIGS. 2 and 7, the first gate pattern G1 and the second gate pattern G2 lie on a first straight line Q1 extending lengthwise in the second direction DR2. For example, the longitudinal axes of the first gate pattern G1 and the second gate pattern G2 may be aligned on the first straight line Q1.

The contact CA1 and the contact CA2 also lie on a second straight line Q2 extending lengthwise in the second direction DR2. For example, the longitudinal axes of the contact CA1 and the contact CA2 may be aligned on the second straight line Q2. The middle contact CM1 extends in the second direction DR2 and electrically connects the adjacent contacts CA1 and CA2.

The reason that the first fin pattern F1 on the first side of the first gate pattern G1 and the second fin pattern F2 on the first side of the second gate pattern G2 are connected by the contacts CA1 and CA2 and the middle contact CM1 is as follows.

If the first fin pattern F1 on the first side of the first gate pattern G1 and the second fin pattern F2 on the first side of the second gate pattern G2 are connected using a contact (i.e., a common contact) extending lengthwise in the second direction DR2 (without using the middle contact CM1), a space margin from an end GE1 of the first gate pattern G1 and an end GE2 of the second gate pattern G2 to the common contact is not sufficient. In this case, a process itself is not impossible, but the insufficient process margin may easily cause a short between the gate patterns G1 and G2 and the common contact (that is, easily cause a process defect).

To prevent such a process defect, the contacts CA1 and CA2 separated from each other are used instead of the common contact. When the contacts CA1 and CA2 separated from each other are used, a process margin from the gate patterns G1 and G2 to the contacts CA1 and CA2 separated from each other may be sufficiently increased. In particular, a first gap L1 between the first gate pattern G1 and the second gate pattern G2 may be smaller than a second gap L2 between the first contact CA1 and the second contact CA2. Accordingly, this may sufficiently increase a distance from the end GE1 of the first gate pattern G1 to an end CAE1 of the contact CA1 and a distance from the end GE2 of the second gate pattern G2 to an end CAE2 of the contact CA2. Therefore, it is possible to secure a sufficient process margin from the gate patterns G1 and G2 to the contacts CA1 and CA2 separated from each other, thereby minimizing process defects.

Figure 8:
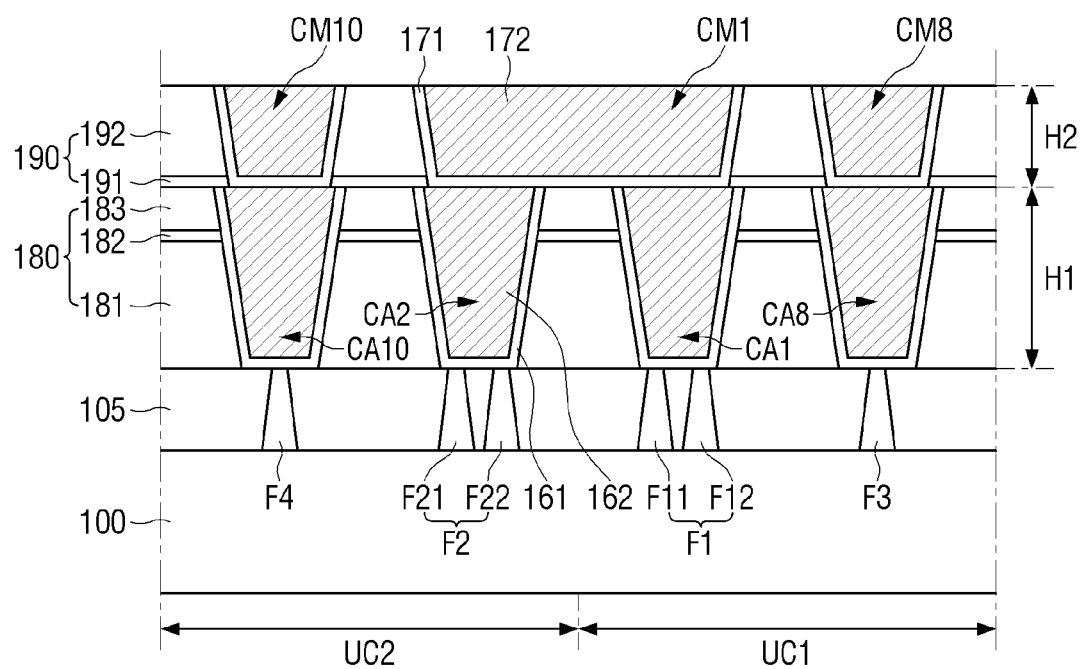
FIG. 8 is a cross-sectional view taken along line A-A of FIG. 2.
Figure 9A:
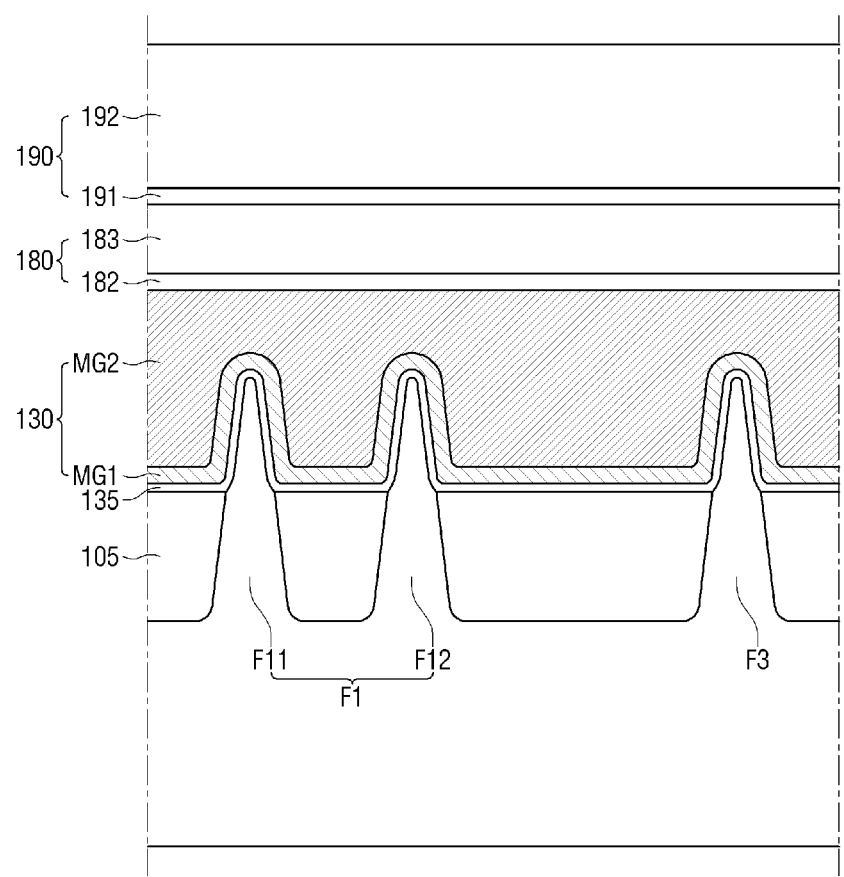
FIG. 9A is a cross-sectional view taken along line B-B of FIG. 2.
Figure 9B:
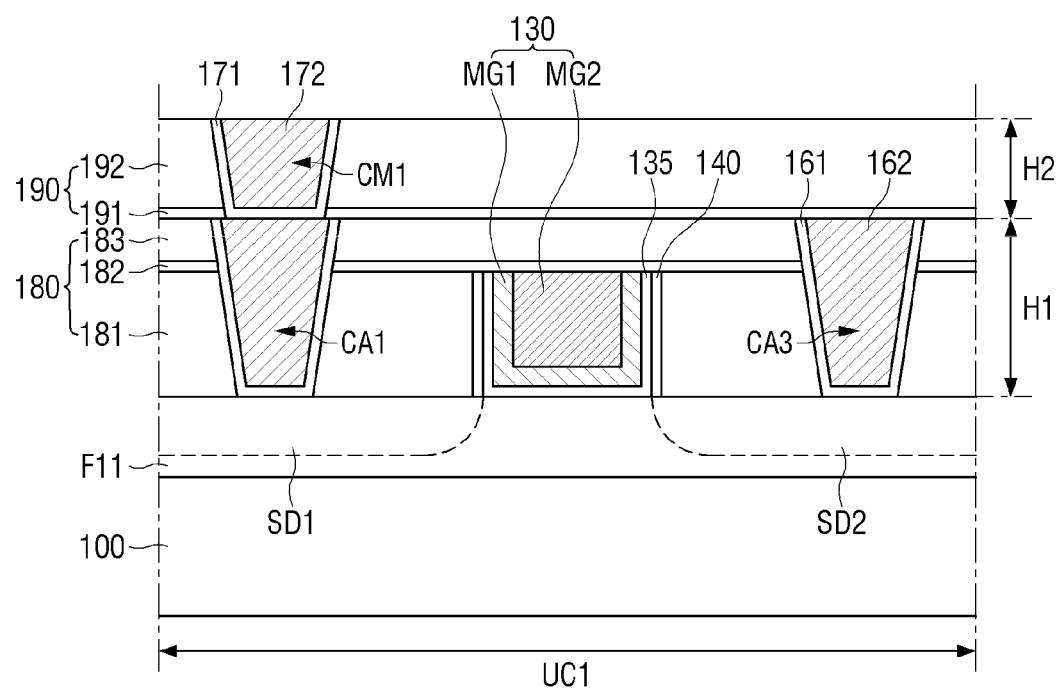
FIG. 9B is a cross-sectional view taken along line D-D of FIG. 2.

FIG. 8 is a cross-sectional view taken along line A-A of FIG. 2. FIG. 9A is a cross-sectional view taken along line B-B of FIG. 2. FIG. 9B is a cross-sectional view taken along line D-D of FIG. 2.

Referring to FIGS. 2, 8, 9A, and 9B, the semiconductor device according to the first embodiment includes the fin patterns F1 through F8, the gate patterns G1 through G6, the contacts CA1 through CA10 and CB1 through CB4, and the middle contacts CM1 and CM3 through CM10.

The substrate 100 may be, for example, a bulk silicon substrate or a silicon-on-insulator (SOI) substrate. Alternatively, the substrate 100 may include a group IV-VI compound semiconductor or a group III-V compound semiconductor. For example, the substrate 100 may include silicon germanium, indium antimonide, lead telluride, indium arsenide, indium phosphide, gallium arsenide, or gallium antimonide. Alternatively, the substrate 100 may include a base substrate and an epitaxial layer formed on the base substrate.

Each of the fin patterns F1 through F8 may be a part of the substrate 100 (e.g., being formed by etching the substrate 100) or may be formed on the substrate 100 (e.g., include an epitaxial layer grown from the substrate 100). Alternatively, each of the fin patterns F1 through F8 may be made of a group IV-VI compound semiconductor or a group III-V compound semiconductor.

A field insulating layer 105 may be formed on the substrate 100. The field insulating layer 105 is formed to fill at least a part of a region (i.e., a trench region) between adjacent fin patterns F1 through F8 and between adjacent sub-fin patterns (e.g., between sub-fin patterns F1$t$ and F12). The field insulating layer 105 may include one of, for example, an oxide layer, a nitride layer, an oxynitride layer, and combinations of the same. The field insulating layer 105 may partially contact the fin patterns F1 through F8. As illustrated in FIG. 9A, at least a part of each of the fin patterns F1 through F8 may protrude above an upper surface of the field insulating layer 105.

A gate pattern (e.g., G1) (corresponding to gate pattern 130 in FIGS. 9A and 9B) may be formed on the field insulating layer 105. As illustrated in FIGS. 9A and 9B, the gate pattern 130 may include two or more stacked metal layers MG1 and MG2. A first metal layer MG1 controls a work function, and a second metal layer MG2 fills a space formed by the first metal layer MG1. For example, the first metal layer MG1 may include, but is not limited to, at least one of TiN, WN, TiAl, TiAlN, TiAlC, TaN, TiC, TaC, TaCN, TaSiN, and combinations of the same. In addition, the second metal layer MG2 may include, but is not limited to, at least one of W, Al, Cu, Co, Ti, Ta, poly-Si, SiGe, and metal alloys.

The gate pattern 130 may be formed by, but not be limited to, a replacement process (or a gate last process).

A gate insulating layer 135 may be formed between the fin patterns (e.g., F1 and F3) and the gate pattern 130. Specifically, the gate insulating layer 135 may be formed along profiles of the fin patterns F1 through F8 protruding above the field insulating layer 105, for example, along the profile of the first fin pattern F1 and the profile of the third fin pattern F3. In addition, the gate insulating layer 135 may be formed between the gate pattern 130 and the field insulating layer 105. For example, the gate insulating layer 135 may be formed on an upper surface of the field insulating layer 105, and the first metal layer MG1 may be formed on an upper surface of the gate insulating layer 135.

The gate insulating layer 135 may include silicon oxide, silicon oxynitride, silicon nitride, or a high dielectric constant (high-k) material having a higher dielectric constant than silicon oxide. The high-k material may include one or more of, for example, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate.

In addition, as illustrated in FIG. 9B, spacers 140 may be formed on sidewalls of the gate pattern 130. The spacers 140 may include at least one of, for example, silicon nitride (SiN), silicon oxynitride (SiON), silicon oxide ($SiO_2$), silicon oxycarbonitride (SiOCN), and combinations of the same.

Source/drain regions SD1 and SD2 may be formed on both sides of the gate pattern 130. The source/drain regions SD1 and SD2 may be formed in the fin patterns F1 through F8. As illustrated in FIG. 9B, the contacts (e.g., contacts CA1 and CA3) may directly contact the source/drain regions SD1 and SD2, respectively.

In addition, although bottom surfaces of the contacts CA1 and CA3 and a bottom surface of the gate pattern 130 are at substantially the same vertical level in FIG. 9B, embodiments are not limited to this case. For example, the contacts CA1 and CA3 may be formed deeper in the fin pattern F1 so that the bottom surfaces of the contacts CA1 and CA2 are located at a lower vertical level than the bottom surface of the gate pattern 130.

A first interlayer insulating film 180 may cover the fin patterns F1 through F8. The first interlayer insulating film 180 may cover the gate pattern 130. The first interlayer insulating film 180 may be formed on the substrate 100, more specifically, on the field insulating layer 105. For example, a lower surface of the first interlayer insulating film 180 may contact an upper surface of the field insulating layer 105.

A first insulating layer 181 may cover the sidewalls of the gate pattern 130. For example, the first insulating layer 181 may contact side surface of the spacers 140, which are formed on and contact the sidewalls of the gate pattern 130. An interlayer liner film 182 and a second insulating layer 183 may be formed on the gate pattern 130. More specifically, the interlayer liner film 182 may be formed along an upper surface of the gate pattern 130, and may contact an upper surface of the gate pattern 130.

The first interlayer insulating film 180 may include the first insulating layer 181, the interlayer liner film 182, and the second insulating layer 183 sequentially formed on the field insulating layer 105. The first insulating layer 181 and the second insulating layer 183 may be separated by, e.g., the interlayer liner film 182.

Each of the first insulating layer 181 and the second insulating layer 183 may include at least one of, for example, silicon oxide, silicon nitride, silicon oxynitride, and a low-k material having a lower dielectric constant than silicon oxide. The low-k material may include, for example, fluorinated tetraethylorthosilicate (FTEOS), hydrogen silsesquioxane (HSQ), bis-benzocyclobutene (BCB), tetramethylorthosilicate (TMOS), octamethyleyclotetrasiloxane (OMCTS), hexamethyldisiloxane (IAMBS), trimethylsilyl borate (TMSB), diacetoxyditertiarybutosiloxane (DADBS), trimethylsilil phosphate (TMSP), polytetrafluoroethylene (PTFE), tonen silazen (TOSZ), fluoride silicate glass (FSG), polyimide nanofoams such as polypropylene oxide, carbon doped silicon oxide (CDO), organo silicate glass (OSG), SiLK, amorphous fluorinated carbon, silica aerogels, silica xerogels, mesoporous silica, or a combination of the same.

The interlayer liner film 182 may include, for example, a different material from the first insulating layer 181 and the second insulating layer 183. The interlayer liner film 182 may include, for example, silicon nitride (SiN).

The contacts CA1 through CA10 and CB1 through CB4 may be formed in the first interlayer insulating film 180. The contacts CA1 through CA10 and CB1 through CB4 may penetrate, for example, the second insulating layer 183, the interlayer liner film 182, and the first insulating layer 181.

Each of the contacts CA1 through CA10 and CB1 through CB4 may include a first barrier layer 161 and a first filling layer 162. The first barrier layer 161 may be formed along a contact hole formed in the first interlayer insulating film 180. The first filling layer 162 may fill the contact hole in which the first barrier layer 161 is formed. The first filling layer 162 may be formed on the first barrier layer 161. Upper surfaces of the first barrier layer 161 and the first filling layer 162 may be coplanar with each other and with an upper surface of the second insulating layer 183.

A second interlayer insulating film 190 includes a first etch stop layer 191 and a third insulating layer 192.

The first etch stop layer 191 may be formed on the second insulating layer 183, and may contact an upper surface of the second insulating layer 183. The first etch stop layer 191 may include at least one of, for example, silicon nitride (SiN), silicon oxynitride (SiON), silicon carbonitride (SiCN), and silicon oxycarbide (SiCO).

The third insulating layer 192 may be disposed on the first etch stop layer 191, and may contact an upper surface of the first etch stop layer 191. The third insulating layer 192 may include at least one of, for example, silicon oxide, silicon nitride, silicon oxynitride, and a low-k material.

Each of the middle contacts CM1 and CM3 through CM10 includes a second barrier layer 171 and a second filling layer 172. The second barrier layer 171 may be formed along a contact hole formed in the second interlayer insulating film 190. The second filling layer 172 may fill the contact hole in which the second barrier layer 171 is formed. The second filling layer 172 may be formed on the second barrier layer 171. Upper surfaces of the second barrier layer 171 and the second filling layer 172 may be coplanar with each other and with an upper surface of the third insulating layer 192.

Each of the first barrier layer 161 and the second barrier layer 171 may include at least one of, for example, tantalum (Ta), tantalum nitride (TaN), titanium (Ti), titanium nitride (TiN), ruthenium (Ru), cobalt (Co), nickel (Ni), nickel boron (NiB), tungsten (W), tungsten nitride (WN), tungsten carbonitride (WCN), zirconium (Zr), zirconium nitride (ZrN), vanadium (V), vanadium nitride (VN), niobium (Nb), niobium nitride (NbN), platinum (Pt), iridium (Ir), and rhodium (Rh).

Each of the first filling layer 162 and the second filling layer 172 may include at least one of, for example, aluminum (Al), copper (Cu), tungsten (W), cobalt (Co), ruthenium (Ru), and molybdenum (Mo).

In particular, as illustrated in FIG. 8, the first fin pattern F1 contacts the contact CA1, and the second fin pattern F2 contacts the contact CA2. The middle contact CM1 is disposed on the adjacent contacts CA1 and CA2 and connects the adjacent contacts CA1 and CA2 to each other. The middle contact CM1 and the contacts CA1 and CA2 are electrically connected to the first voltage (e.g., the ground voltage VSS).

The middle contacts (e.g., middle contacts CM1, CM8, and CM10) are different from a wiring structure (i.e., a wiring structure including a via and/or general wiring). Each of the middle contacts CM1 and CM8 through CM10 may be shaped like a wiring not including a via and extending in one direction. The middle contacts CM1 and CM8 through CM10 may be relatively shorter in length than the general wiring.

The middle contacts (e.g., middle contacts CM1, CM8, and CM10) are also different from other contacts (e.g., contacts CA1, CA2, CA8, and CA10). The middle contacts CM1, CM8, and CM10 are used to route adjacent gate contacts and/or source/drain contacts to each other. In cross section, a height H1 of each of the contacts (e.g., contacts CA1 and CA2) is greater than a height H2 of the middle contact (e.g., middle contact CM1).

Figure 10:
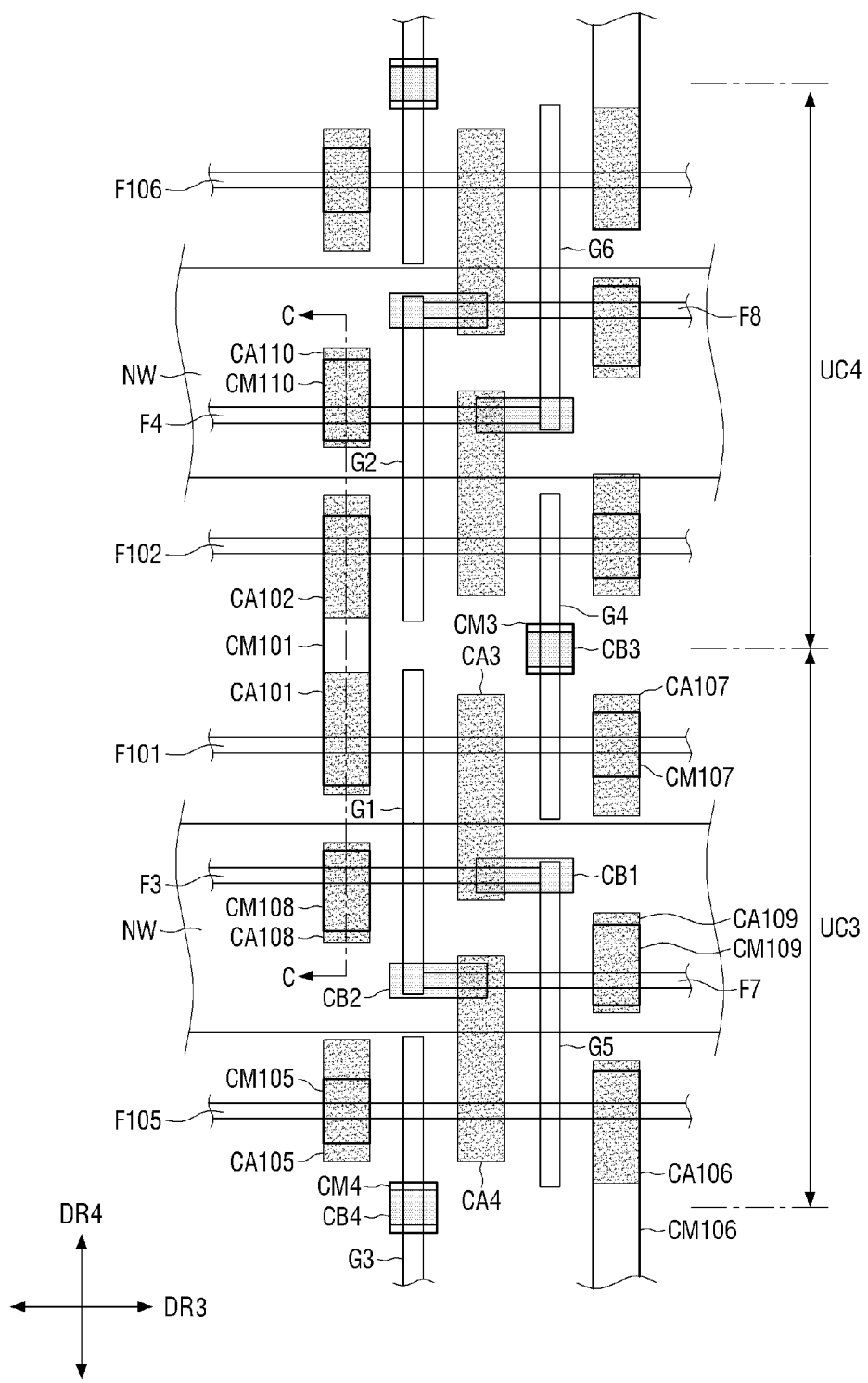
FIG. 10 is a layout view of a semiconductor device according to a second example embodiment.
Figure 11:
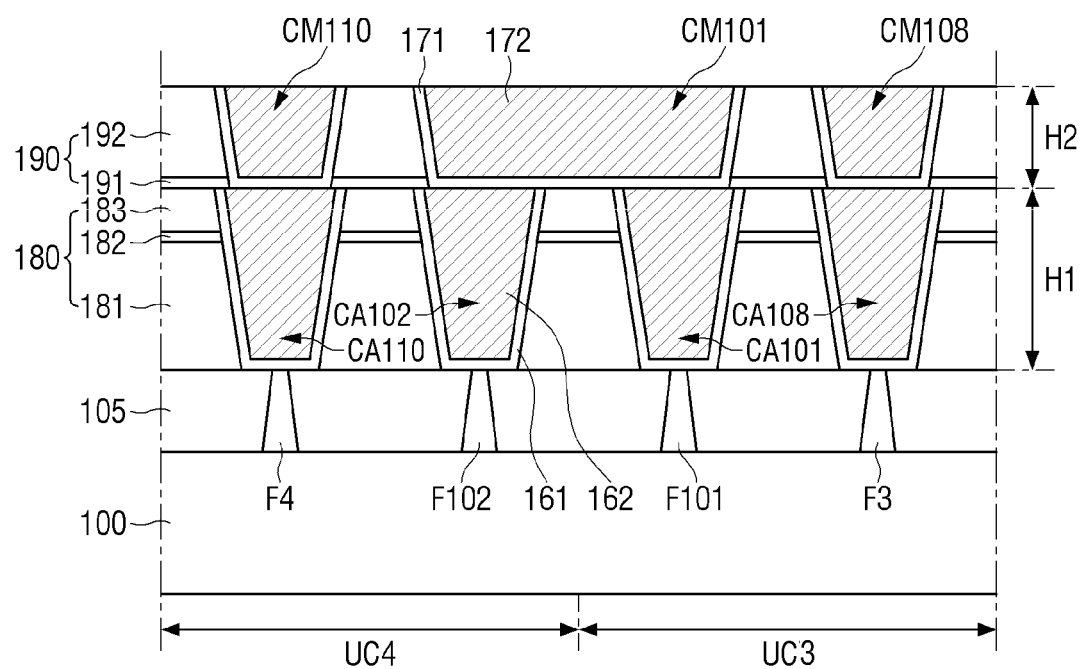
FIG. 11 is a cross-sectional view taken along line C-C of FIG. 10.

FIG. 10 is a layout view of a semiconductor device according to a second example embodiment. FIG. 11 is a cross-sectional view taken along line C-C of FIG. 10. For ease of description, differences from the semiconductor device described above with reference to FIGS. 1 through 9B will be mainly described.

Referring to FIGS. 2, 3, and 8, in the semiconductor device according to the first embodiment, some fin patterns F1, F2, F5, and F6 include n sub-fin patterns, where n is a natural number of 2 or more. On the other hand, referring to FIGS. 10 and 11, in the semiconductor device according to the second embodiment, some fin patterns F101, F102, F105, and F106 may include m sub-fin patterns, where m is a natural number smaller than n.

For example, as illustrated, in the semiconductor device according to the first embodiment, some fin patterns F1, F2, F5, and F6 may include two sub-fin patterns. In the semiconductor device according to the second embodiment, some fin patterns F101, F102, F105, and F106 may include one sub-fin pattern.

In the semiconductor device according to the first embodiment, transistors formed in the fin patterns F1, F2, F5, and F6 may have a relatively high current driving capability. On the other hand, in the semiconductor device according to the second embodiment, transistors formed in the fin patterns F101, F102, F105, and F106 may have a relatively high degree of integration.

Referring to FIGS. 10 and 11, in a third unit cell UC3, a contact CA101 is formed on a first side of a first gate pattern G1 to contact the fin pattern F101. A contact CA105 is formed on a first side of a third gate pattern G3 to contact the fin pattern F105. A contact CA106 is formed on a second side of a fifth gate pattern G5 to contact the fin pattern F105. A contact CA107 is formed on a second side of a fourth gate pattern G4 to contact the fin pattern F101. A contact CA108 is formed on the first side of the first gate pattern G1 to contact a fin pattern F3. A contact CA109 is formed on the second side of the fifth gate pattern G5 to contact a fin pattern F7.

In a fourth unit cell UC4, a contact CA102 is formed on a first side of a second gate pattern G2 to contact the fin pattern F102. A contact CA110 is formed on the first side of the second gate pattern G2 to contact a fin pattern F4.

A middle contact CM101 is disposed on the adjacent contacts CA101 and CA102 to connect the adjacent contacts CA101 and CA102 to each other. The middle contact CM101 is electrically connected to a first voltage (e.g., a ground voltage VSS).

A middle contact CM105 may be disposed on the contact CA105 and may be electrically connected to a bit line BL. A middle contact CM106 may be disposed on the contact CA106 and may be connected to the first voltage (e.g., the ground voltage VSS). A middle contact CM107 may be disposed on the contact CA107 and may be electrically connected to a bit line BLB. A middle contact CM108 may be disposed on the contact CA108 and may be electrically connected to a power supply voltage VDD. A middle contact CM109 may be disposed on the contact CA109 and may be electrically connected to the power supply voltage VDD. A middle contact CM110 may be disposed on the contact CA110 and may be electrically connected to the power supply voltage VDD.

In cross section, a height H1 of each of the contacts (e.g., contacts CA101, CA102, CA108, and CA110) is greater than a height H2 of each of the middle contacts (e.g., middle contacts CM101, CM108, and CM110).

Figure 12:
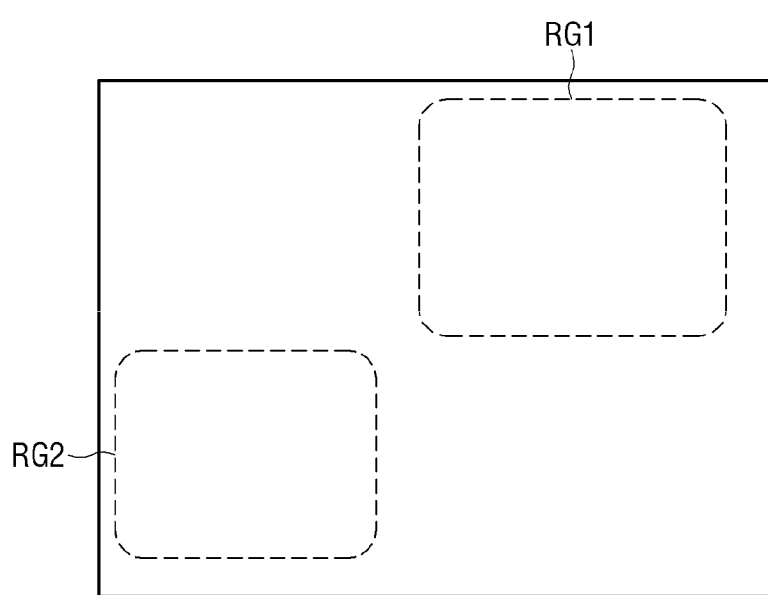
FIG. 12 is a block diagram of a semiconductor device according to a third example embodiment.
Figure 13:
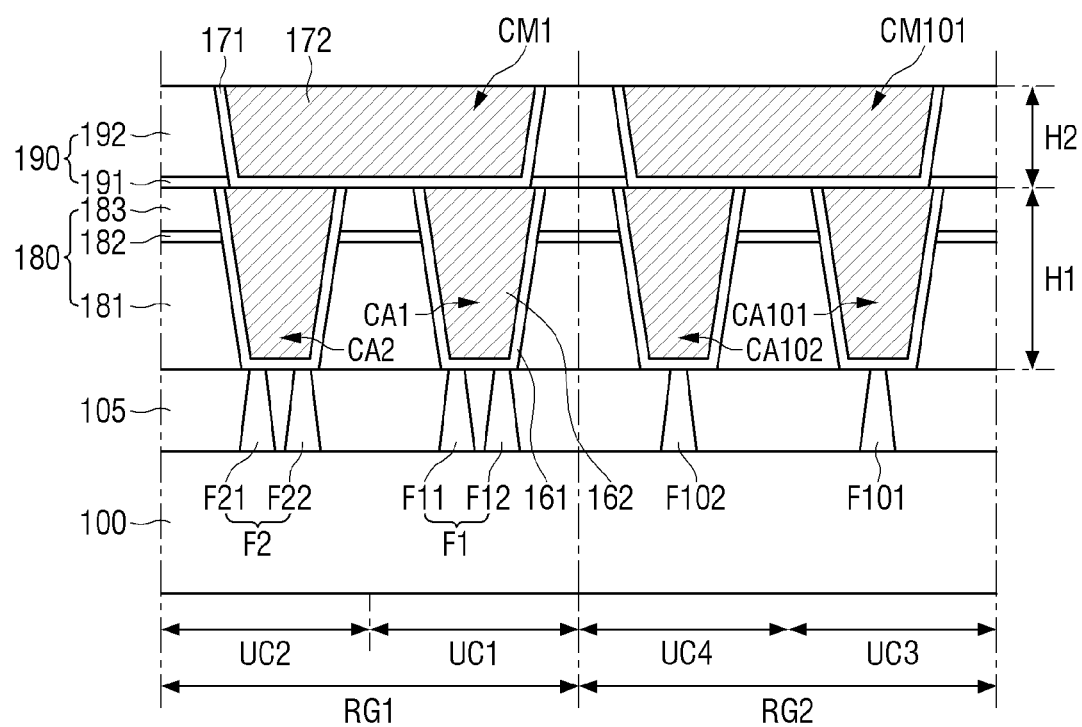
FIG. 13 is a cross-sectional view of the semiconductor device according to the third example embodiment.

FIG. 12 is a block diagram of a semiconductor device according to a third example embodiment. FIG. 13 is a cross-sectional view of the semiconductor device according to the third example embodiment.

Referring to FIGS. 12 and 13, the semiconductor device according to the third embodiment includes a first region RG1 and a second region RG2 different from each other.

The SRAM device described above with reference to FIGS. 2 through 9B may be disposed in the first region RG1, and the SRAM device described above with reference to FIGS. 10 and 11 may be disposed in the second region RG2.

Specifically, a first unit cell UC1 and a second unit cell UC2 are formed in the first region RG1. The first unit cell UC1 includes a first fin pattern F1 extending lengthwise in a first direction DR1, a first gate pattern G1 extending lengthwise in a second direction DR2 to intersect the first fin pattern F1, and a contact CA1 disposed on a first side of the first gate pattern G1 to contact the first fin pattern F1.

In addition, a second unit cell UC2 includes a second fin pattern F2 extending lengthwise in the first direction DR1, a second gate pattern G2 extending lengthwise in the second direction DR2 to intersect the second fin pattern F2, and a contact CA2 disposed on a first side of the second gate pattern G2 to contact the second fin pattern F2.

Here, the first gate pattern G1 and the second gate pattern G2 are spaced apart from each other and lie on a first straight line Q1 extending lengthwise in the second direction DR2. For example, the longitudinal axes of the first gate pattern G1 and the second gate pattern G2 may be aligned on the first straight line Q1. The contacts CA1 and CA2 are spaced apart from each other and lie on a second straight line Q2 extending lengthwise in the second direction DR2. For example, the longitudinal axes of the contacts CA1 and CA2 may be aligned on the second straight line Q2. A middle contact CM1 is disposed on the adjacent contacts CA1 and CA2 and connects the adjacent contacts CA1 and CA2 to each other. In addition, the middle contact CM1 and the adjacent contacts CA1 and CA2 may be connected to a first voltage (e.g., a ground voltage VSS).

On the other hand, a third unit cell UC3 and a fourth unit cell UC4 are formed in the second region RG2.

The third unit cell UC3 includes a fin pattern (e.g., fin pattern F101) extending lengthwise in a third direction DR3 and a gate pattern G1 extending lengthwise in a fourth direction DR4 to intersect the fin pattern F101.

The fourth unit cell UC4 includes a fin pattern (e.g., fin pattern F102) extending lengthwise in the third direction DR3 and a gate pattern G2 extending lengthwise in the fourth direction DR4 to intersect the fin pattern F102.

In addition, a contact CA101 contacts the fin pattern F101, and a contact CA102 contacts the fin pattern F102. A middle contact CM101 is disposed on the adjacent contacts CA101 and CA102 and connects the adjacent contacts CA101 and CA102 to each other. In addition, the middle contact CM101 and the adjacent contacts CA101 and CA102 may be connected to the first voltage (e.g., the ground voltage VSS).

As illustrated, the middle contact CM1 of the first region RG1 and the middle contact CM101 of the second region RG2 may be disposed at the same vertical level. In cross section, a height H1 of each of the contacts (e.g., contacts CA1, CA2, CA101, and CA102) is greater than a height H2 of each of the middle contacts (e.g., middle contacts CM1 and CM101).

As illustrated, the fin patterns (e.g., fin patterns F1 and F2) of the first region RG1 may include n sub-fin patterns, and the fin patterns (e.g., fin patterns F101 and F102) of the second region RG2 may include m sub-fin patterns, where n is a natural number of two or more, and m is a natural number smaller than n. For example, as illustrated, each of the fin patterns F1 and F2 may include two sub-fin patterns, and each of the fin patterns F101 and F102 may include one sub-fin pattern.

Figure 14:
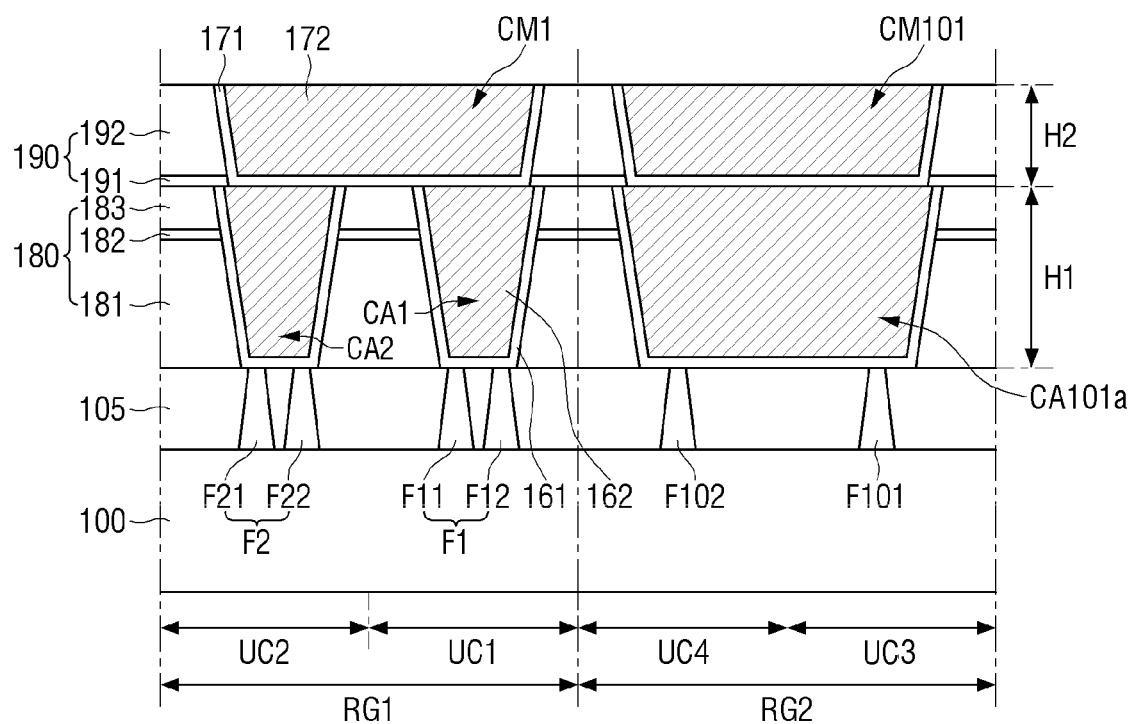
FIG. 14 is a cross-sectional view of a semiconductor device according to a fourth example embodiment.

FIG. 14 is a cross-sectional view of a semiconductor device according to a fourth example embodiment. For ease of description, differences from the semiconductor device described above with reference to FIGS. 12 and 13 will be mainly described.

Referring to FIG. 14, a third unit cell UC3 and a fourth unit cell UC4 are formed in a second region RG2. In particular, a common contact CA101a may be formed on a fin pattern F101 of the third unit cell UC3 and a fin pattern F102 of the fourth unit cell UC4 and may directly contact the fin patterns F101 and F102. A middle contact CM101 may be located on the common contact CA101a. That is, when a process defect (e.g., a short between a gate pattern and a contact) does not occur easily, a relatively large common contact CA101a may be used (for some regions).

The common contact CA101a of the second region RG2 may be at the same vertical level as contacts CA1 and CA2 of a first region RG1. The middle contact CM101 of the second region RG2 may be at the same vertical level as a middle contact CM1 of the first region RG1. In cross section, a height H1 of each of the contacts (e.g., contacts CA1, CA2, and CA101a) is greater than a height H2 of each of the middle contacts (e.g., middle contacts CM1 and CM101).

Figure 15:
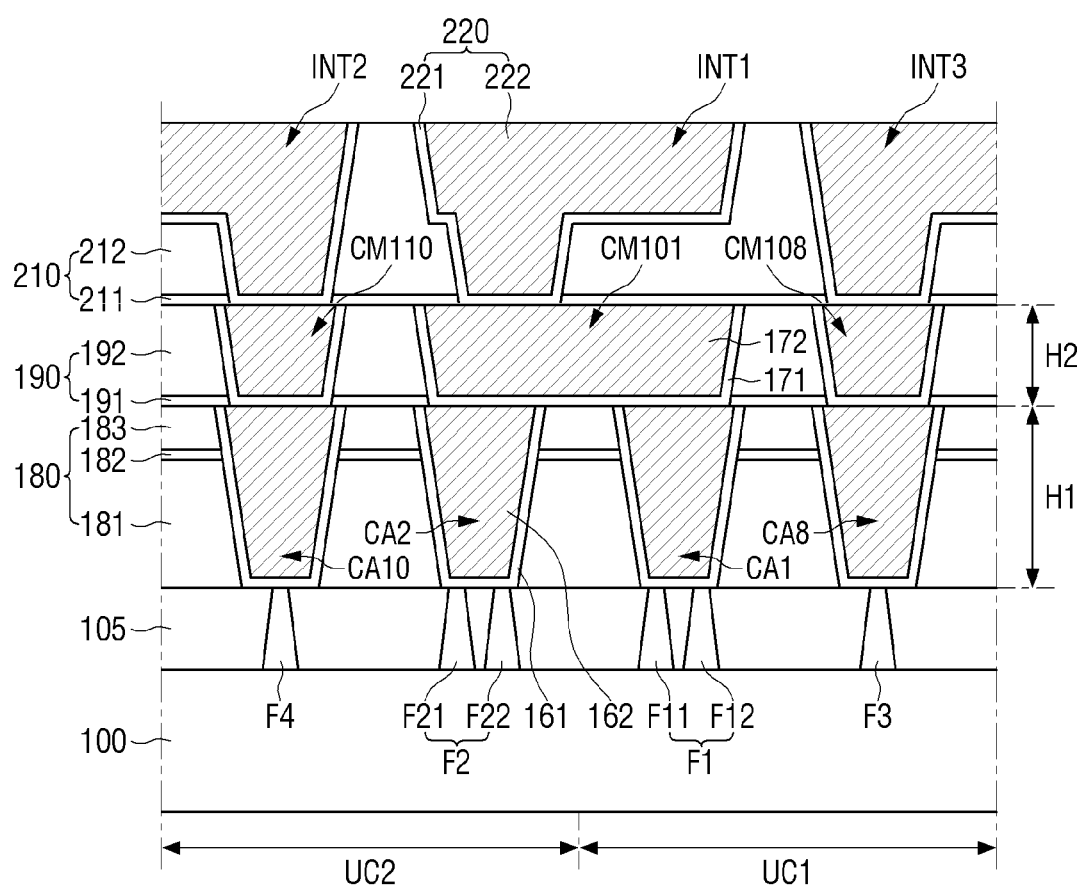
FIG. 15 is a cross-sectional view of a semiconductor device according to a fifth example embodiment.

FIG. 15 is a cross-sectional view of a semiconductor device according to a fifth example embodiment. For ease of description, differences from the semiconductor device described above with reference to FIGS. 1 through 9B will be mainly described.

Referring to FIG. 15, in the semiconductor device according to the fifth example embodiment, wiring structures INT1, INT2, and INT3 are additionally disposed on middle contacts (e.g., middle contacts CM101, CM108, and CM110). The connection relationship between the middle contacts CM101, CM108, and CM110 and the wiring structures INT1, INT2, and INT3 is illustrated by way of example, but embodiments are not limited to this connection relationship.

Specifically, a third interlayer insulating film 210 includes a second etch stop layer 211 and a fourth insulating layer 212.

The second etch stop layer 211 may be formed on a third insulating layer 192. The second etch stop layer 211 may include at least one of, for example, silicon nitride (SiN), silicon oxynitride (SiON), silicon carbonitride (SiCN), and silicon oxycarbide (SiCO).

The fourth insulating layer 212 may be disposed on the second etch stop layer 211. The fourth insulating layer 212 may include at least one of, for example, silicon oxide, silicon nitride, silicon oxynitride, and a low-k material.

Each of the wiring structures INT1, INT2, and INT3 may include a third barrier layer 221 and a third filling layer 222. The third barrier layer 221 may be formed along a contact hole formed in the third interlayer insulating film 210. The third barrier layer 221 may contact an upper surface of the middle contact on which it is disposed (e.g., middle contacts CM101, CM108, and CM110). The third filling layer 222 may be formed on the third barrier layer 221 to fill the contact hole in which the third barrier layer 221 is formed.

The third barrier layer 221 may include at least one of, for example, tantalum (Ta), tantalum nitride (TaN), titanium (Ti), titanium nitride (TiN), ruthenium (Ru), cobalt (Co), nickel (Ni), nickel boron (NiB), tungsten (W), tungsten nitride (WN), tungsten carbonitride (WCN), zirconium (Zr), zirconium nitride (ZrN), vanadium (V), vanadium nitride (VN), niobium (Nb), niobium nitride (NbN), platinum (Pt), iridium (Ir), and rhodium (Rh).

The third filling layer 222 may include at least one of, for example, copper (Cu), aluminum (Al), tungsten (W), cobalt (Co), ruthenium (Ru), and molybdenum (Mo).

Although each of the wiring structures INT1, INT2 and INT3 includes a via in the drawing, embodiments are not limited to this case. That is, each of the wiring structures INT1, INT2, and INT3 may also include a general wiring without including a via, and the general wiring may be directly connected to each of the middle contacts CM101, CM108, and CM110.

A layout design method according to embodiments will now be described with reference to FIGS. 16 and 17.

Figure 16:
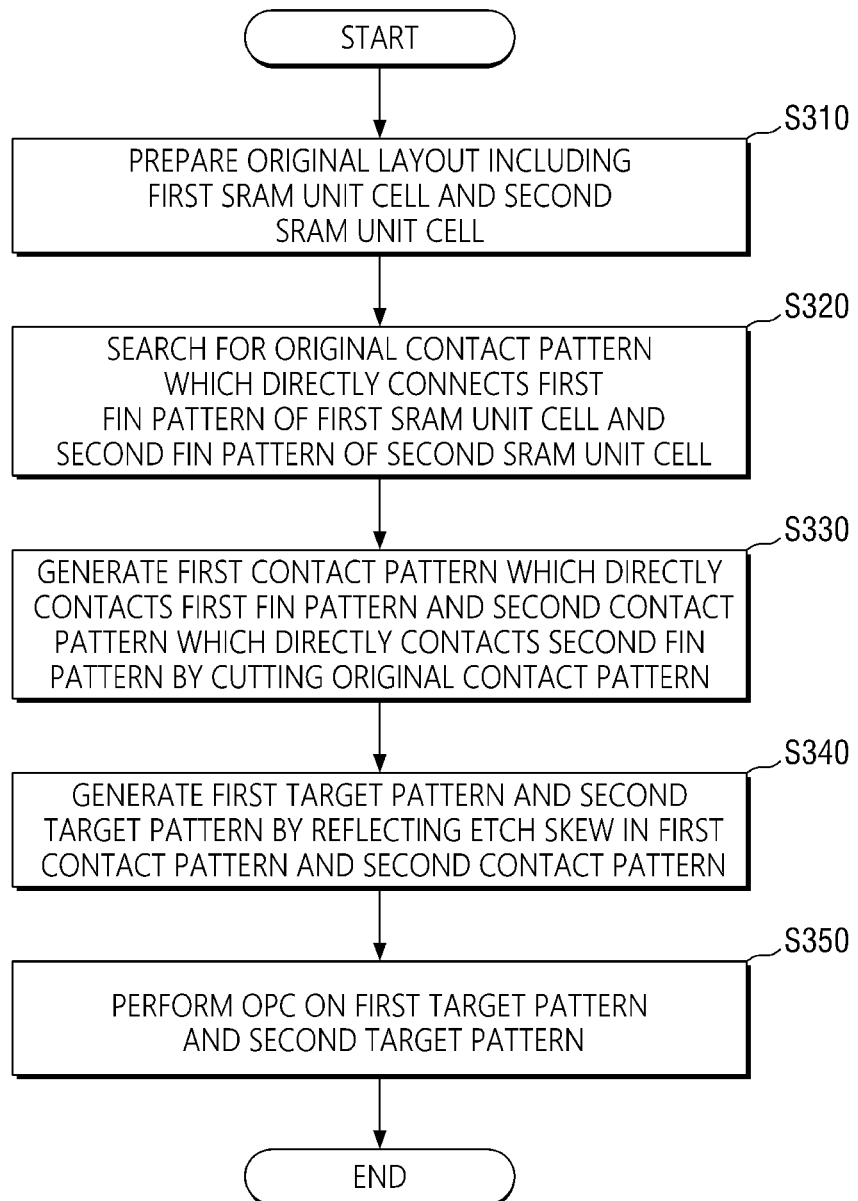
FIG. 16 is a flowchart illustrating a layout design method according to example embodiments.

FIG. 16 is a flowchart illustrating a layout design method according to example embodiments. FIG. 17 is a diagram for explaining operations S320, S330, and S340 of FIG. 16. FIG. 18 is a diagram for explaining operation S320 of FIG. 16.

Referring to FIG. 16, a designer creates/prepares an original layout (or a full-chip layout) (operation S310).

The original layout is a set of patterns (hereinafter, referred to as original patterns) that the designer desires to finally implement on a wafer. For example, the layout may be a data format such as Open Artwork System Interchange Standard (OASIS) or Graphic Data System II (GDS2). The original layout may include a first SRAM unit cell and a second SRAM unit cell. For example, as discussed in FIG. 1, each of the first and second SRAM unit cells may include a first inverter INV1, a second inverter INV2, a first pass element PG1, and a second pass element PG2.

Next, a table driven layer operation (TDLO) is performed (operations S320, S330, and S340).

The TDLO is a pre-optical proximity correction (pre-OPC) operation. In the TDLO, target patterns (or pre-OPC target patterns) are generated based on the original patterns. For example, the target patterns may be generated by pushing or pulling edges of the original patterns in consideration of factors such as etch skew. For example, the original patterns of 5×50 size may be changed to the target patterns of 5×70 size in consideration of etch skew. In addition, for accurate implementation of the original patterns, a dummy may be added to an empty region (that is, a dummy target pattern may be generated). A layer is defined by computing the original patterns and the generated target patterns (for example, by performing addition or subtraction or finding a complementary set).

In particular, in the TDLO of the layout design method according to the example embodiments, layout correction may be performed on a region where a process defect occurs easily due to an insufficient process margin although a process itself is not impossible.

Figure 17:
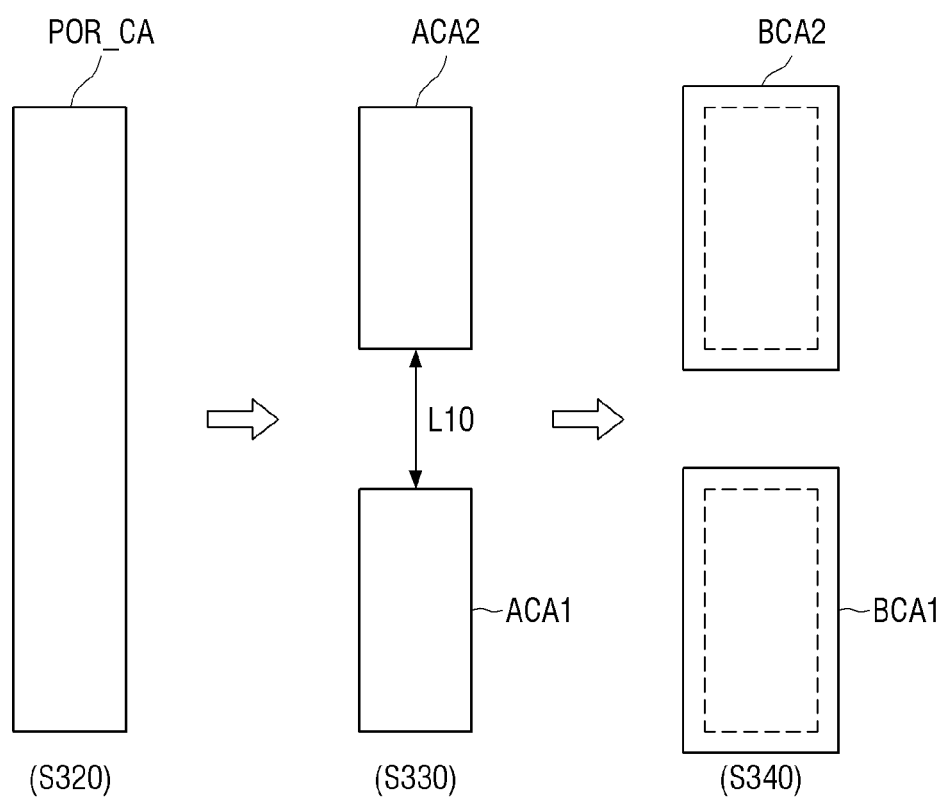
FIG. 17 is a diagram for explaining example operations of FIG. 16.
Figure 18:
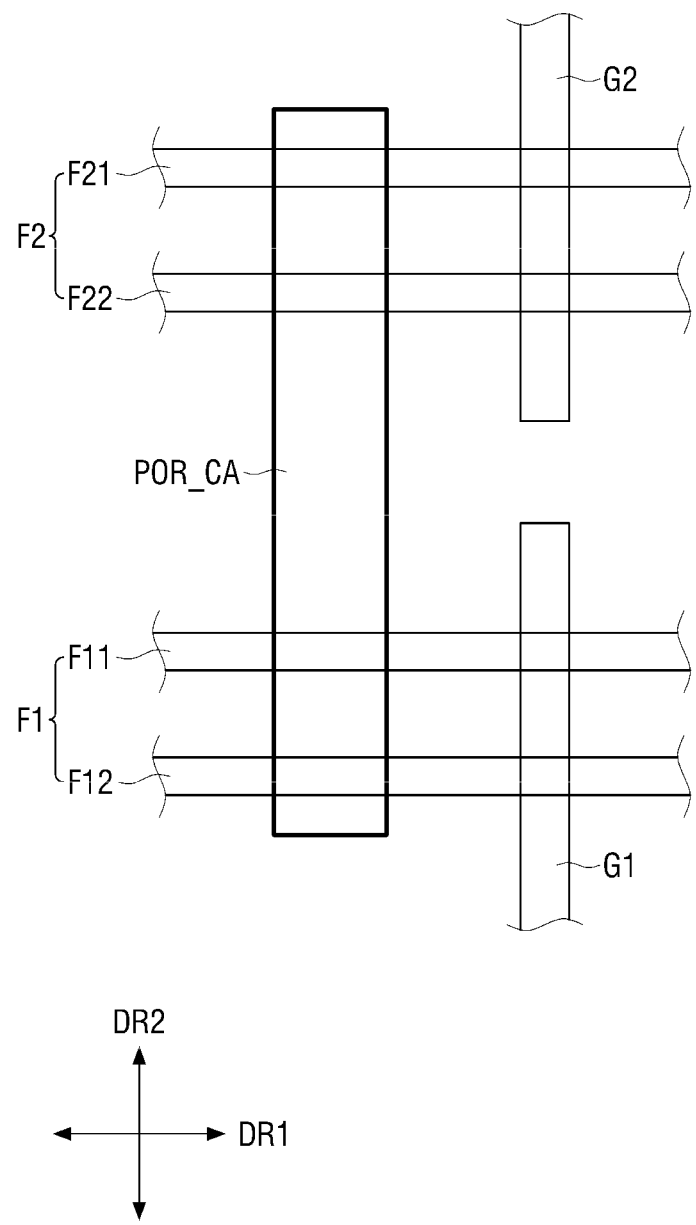
FIG. 18 is a diagram for explaining example operations of FIG. 16.

Specifically, referring to FIGS. 16 through 18, an original contact pattern POR_CA (see FIG. 18) directly connecting a first fin pattern F1 of a first SRAM unit cell and a second fin pattern F2 of a second SRAM unit cell is searched for (operation S320).

As illustrated, it is assumed that an original layout includes the original contact pattern POR_CA which is disposed on a first side of a first gate pattern G1 to directly contact the first fin pattern F1 of the first SRAM unit cell and disposed on a first side of the second gate pattern G2 of the second SRAM unit cell to directly contact the second fin pattern F2 and directly connects the first fin pattern F1 and the second fin pattern F2. The original contact pattern POR_CA is a region of an SRAM semiconductor device in which a process defect occurs easily. That is, a process defect may occur easily due to an insufficient space margin from an end of the first gate pattern G1 and an end of the second gate pattern G2 to the original contact pattern POR_CA.

Referring to FIGS. 16 and 17, the original contact pattern POR_CA, which is searched for and found in operation S320, is cut to generate a first contact pattern ACA1 which directly contacts the first fin pattern F1 and a second contact pattern ACA2 which directly contacts the second fin pattern F2 (operation S330).

Here, the original contact pattern POR_CA is cut in consideration of an after development inspection (ADI) critical dimension (CD). As a result, a gap L10 between the first contact pattern ACA1 and the second contact pattern ACA2 may be equal to or greater than the ADI CD.

Referring to FIGS. 16 and 17, a first target pattern BCA1 and a second target pattern BCA2 are generated by reflecting etch skew in the first contact pattern ACA1 and the second contact pattern ACA2 (operation S340).

As illustrated, since the first target pattern BCA1 and the second target pattern BCA2 reflect the etch skew, edges of the first target pattern BCA1 and the second target pattern BCA2 are different (pushed or pulled) from edges of the first contact pattern ACA1 and the second contact pattern ACA2.

Next, referring to FIG. 16, OPC is performed on the first target pattern BCA1 and the second target pattern BCA2 (operation S350). In the OPC, optical phenomena that may occur in an exposure process of the layer defined in the TDLO are compensated for. For example, the OPC may include optimization of a defocus stand (DS) position, a best focus (BF) position, etc. in the exposure process. In addition, the OPC may include diffraction of light or optimization of the optical state of an exposure facility itself. However, the generation of an OPC model is not limited to the above description. In some embodiments, the first target pattern BCA1 and the second target pattern BCA2 may be used to generate contacts CA1 and CA2 as illustrated in, for example, FIG. 2.

In concluding the detailed description, those skilled in the art will appreciate that many variations and modifications may be made to the preferred embodiments without substantially departing from the principles of the present inventive concept. Therefore, the disclosed preferred embodiments of the inventive concept are used in a generic and descriptive sense only and not for purposes of limitation.

What is claimed is:

1. A semiconductor device comprising:
   a first unit cell; and
   a second unit cell,
   wherein the first unit cell comprises a first fin pattern extending lengthwise in a first direction, a first gate pattern extending lengthwise in a second direction to intersect the first fin pattern, and a first contact disposed on a side of the first gate pattern to contact the first fin pattern,
   wherein the second unit cell comprises a second fin pattern extending lengthwise in the first direction, a second gate pattern extending lengthwise in the second direction to intersect the second fin pattern, and a second contact disposed on a side of the second gate pattern to contact the second fin pattern,
   wherein the first gate pattern and the second gate pattern are spaced apart from each other and lie on a first straight line extending lengthwise in the second direction, the first contact and the second contact are spaced apart from each other and lie on a second straight line extending lengthwise in the second direction, and a first middle contact is disposed on the first contact and the second contact and connects the first contact and the second contact to each other,
   wherein a width in the second direction of a top surface of the first middle contact is greater than a width in the second direction of a bottom surface of the first middle contact,
   wherein a width in the second direction of a top surface of the first contact is less than the width in the second direction of the bottom surface of the first middle contact, and
   wherein the bottom surface of the first middle contact is in contact with the top surface of the first contact.

2. The semiconductor device of claim 1, wherein the first contact, the second contact, and the first middle contact are connected to a ground voltage.

3. The semiconductor device of claim 1, wherein a height of the first contact is greater than a height of the first middle contact.

4. The semiconductor device of claim 1, wherein the first gate pattern and the second gate pattern are spaced apart by a first gap, the first contact and the second contact are spaced apart by a second gap, and the first gap is smaller than the second gap.

5. The semiconductor device of claim 1, wherein the first unit cell further comprises a third fin pattern extending lengthwise in the first direction to intersect the first gate pattern and a third contact disposed on the side of the first gate pattern to contact the third fin pattern and lying on the second straight line, and a second middle contact is disposed on the third contact and the second straight line and formed at the same vertical level as the first middle contact.

6. The semiconductor device of claim 5, wherein the third contact and the second middle contact are connected to a power supply voltage.

7. The semiconductor device of claim 5, wherein the first unit cell further comprises a fourth contact disposed on the other side of the first gate pattern to contact the first fin pattern and the third fin pattern, and the fourth contact is formed at the same vertical level as the first contact.

8. The semiconductor device of claim 5, wherein the first fin pattern comprises n sub-fin patterns, and the third fin pattern comprises m sub-fin patterns, where n is a natural number of 2 or more, and m is a natural number smaller than n.

9. The semiconductor device of claim 1, wherein the first unit cell is a static random access memory (SRAM) unit cell, and the second unit cell is an SRAM unit cell.

10. The semiconductor device of claim 1, comprising:
a first region; and
a second region,
wherein the first unit cell and the second unit cell are formed in the first region, and a third unit cell and a fourth unit cell are formed in the second region, and
wherein the third unit cell comprises a fourth fin pattern extending lengthwise in a third direction and a third gate pattern extending lengthwise in a fourth direction to intersect the fourth fin pattern, the fourth unit cell comprises a fifth fin pattern extending lengthwise in the third direction and a fourth gate pattern extending lengthwise in the fourth direction to intersect the fifth fin pattern, and a common contact is disposed on a side of the third gate pattern to contact the fourth fin pattern and disposed on a side of the fourth gate pattern to contact the fifth fin pattern.

11. The semiconductor device of claim 10, comprising a third middle contact which is formed on the common contact and formed at the same vertical level as the first middle contact.

12. A semiconductor device comprising:
a first gate pattern and a second gate pattern which lie on a first straight line extending in a first direction and extend lengthwise in the first direction;
a first contact and a second contact which lie on a second straight line extending in the first direction and extend lengthwise in the first direction; and
a middle contact which is disposed on the first contact and the second contact and extends in the first direction to connect the first contact and the second contact to each other,
wherein a first gap between the first gate pattern and the second gate pattern is smaller than a second gap between the first contact and the second contact,
wherein a width in the second direction of a top surface of the middle contact is greater than a width in the second direction of a bottom surface of the middle contact,
wherein a width in the second direction of a top surface of the first contact is less than the width in the second direction of the bottom surface of the first middle contact, and
wherein the bottom surface of the first middle contact is in contact with the top surface of the first contact.

13. The semiconductor device of claim 12, further comprising a wiring structure which is disposed on the middle contact to contact the middle contact.

14. The semiconductor device of claim 12, wherein the first contact, the second contact, and the middle contact are connected to a ground voltage.

15. A semiconductor device comprising:
a first fin pattern, a second fin pattern, and a third fin pattern which are arranged sequentially;
a first contact, a second contact, and a third contact which contact the first fin pattern, the second fin pattern, and the third fin pattern, respectively;
a first middle contact which is disposed on the first contact and the second contact and directly contacts the first contact and the second contact; and
a second middle contact which is disposed on the third contact, is formed at the same vertical level as the first middle contact, and directly contacts the third contact,
wherein the first middle contact is connected to a first voltage, and the second middle contact is connected to a second voltage higher than the first voltage,
wherein a width in the second direction of a top surface of the first middle contact is greater than a width in the second direction of a bottom surface of the first middle contact,
wherein a width in the second direction of a top surface of the first contact is less than the width in the horizontal direction of the bottom surface of the first middle contact, and
wherein the bottom surface of the first middle contact is in contact with the top surface of the first contact.

16. The semiconductor device of claim 15, wherein the first fin pattern belongs to a first SRAM unit cell, and the second fin pattern and the third fin pattern belong to a second SRAM unit cell.

17. The semiconductor device of claim 15, wherein the first voltage is a ground voltage, and the second voltage is a power supply voltage.

18. The semiconductor device of claim 15, wherein a height of the first contact is greater than a height of the first middle contact.

19. The semiconductor device of claim 15, wherein each of the first fin pattern and the second fin pattern comprises n sub-fin patterns, and the third fin pattern comprises m sub-fin patterns, where n is a natural number of 2 or more, and m is a natural number smaller than n.

* * * * *